United States Patent
Odabasi et al.

(10) Patent No.: US 10,990,731 B1
(45) Date of Patent: Apr. 27, 2021

(54) DYNAMIC VOLTAGE DROP ANALYSIS WITH IMPROVED COVERAGE

(71) Applicant: ANSYS, INC., Canonsburg, PA (US)

(72) Inventors: Altan Odabasi, Austin, TX (US); Emrah Acar, Montvale, NJ (US); Sudarsana Reddy Mallu, Austin, TX (US); Tinu Thomas, Austin, TX (US); Mirza Milan, Austin, TX (US); Scott Johnson, Pflugerville, TX (US); Joao Geada, Chelmsford, MA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 16/723,870

(22) Filed: Dec. 20, 2019

(51) Int. Cl.
*G06F 17/50* (2006.01)
*G06F 30/3312* (2020.01)
*G06F 30/337* (2020.01)
*G06F 30/398* (2020.01)

(52) U.S. Cl.
CPC ........ *G06F 30/3312* (2020.01); *G06F 30/337* (2020.01); *G06F 30/398* (2020.01)

(58) Field of Classification Search
CPC ... G06F 30/3312; G06F 30/337; G06F 30/398
USPC .................... 716/115, 109, 133, 136; 703/15
See application file for complete search history.

(56) References Cited

U.S. PATENT DOCUMENTS

| | | | | |
|---|---|---|---|---|
| 6,028,440 A * | 2/2000 | Roethig | ................... | G11C 5/14 324/760.02 |
| 6,721,929 B2 * | 4/2004 | Li | .......................... | G06F 30/33 716/113 |
| 6,782,347 B2 * | 8/2004 | Hirano | ................... | G06F 30/367 702/183 |
| 6,938,233 B2 * | 8/2005 | Satoh | ...................... | G06F 30/33 716/113 |
| 6,988,254 B2 * | 1/2006 | Iwanishi | ............. | G06F 30/3312 716/114 |
| 7,103,863 B2 * | 9/2006 | Riepe | ...................... | G06F 30/30 716/113 |
| 7,142,991 B2 * | 11/2006 | Hathaway | ............. | G06F 30/367 702/57 |
| 7,367,000 B2 * | 4/2008 | Kurihara | ............... | G06F 30/367 716/115 |

(Continued)

OTHER PUBLICATIONS

Rodriguez, "Modelling and Simulation of the IR-Drop Phenomenon in Integrated Circuits", Univiesite Montpellier II—Sciences et Techniques du Languedoc, 2013, 162 pages. (Year: 2013).*

*Primary Examiner* — Phallaka Kik
(74) *Attorney, Agent, or Firm* — Womble Bond Dickinson (US) LLP

(57) ABSTRACT

This disclosure describes methods, systems and media for analyzing voltage drops in a power delivery network in a simulated design of an electrical circuit. In one embodiment, a system determines, for a victim element ("victim"), a voltage drop caused by each aggressor element ("aggressor") in a set of aggressors in the design and creates a data structure that includes, for each victim, at least one of: (1) each voltage drop caused by each aggressor in the set of aggressors or (2) a sum of the voltage drops on the victim caused by all of the aggressors in the set of aggressors. The system can then compute a set of simulations based on random inputs to generate a distribution of possible voltage drops for each victim using data in the data structure.

20 Claims, 16 Drawing Sheets

(56) References Cited

U.S. PATENT DOCUMENTS

| | | | | |
|---|---|---|---|---|
| 7,557,587 B2* | 7/2009 | Ogawa | G06F 1/3287 | 324/603 |
| 7,752,578 B2* | 7/2010 | Allen | G06F 30/367 | 716/123 |
| 7,865,850 B1* | 1/2011 | Kao | G06F 30/39 | 716/136 |
| 7,900,166 B2* | 3/2011 | Kariat | G06F 30/367 | 703/14 |
| 8,291,361 B2* | 10/2012 | Higashi | G06F 30/39 | 716/104 |
| 8,327,305 B1* | 12/2012 | Hooi | G06F 30/392 | 716/124 |
| 8,327,306 B2* | 12/2012 | Oh | G06F 30/39 | 716/133 |
| 8,667,455 B1* | 3/2014 | Ho | G06F 30/39 | 716/139 |
| 8,881,080 B2* | 11/2014 | Sajid | G06F 30/398 | 716/113 |
| 8,954,917 B1* | 2/2015 | Shu | G06F 30/367 | 716/136 |
| 10,289,141 B2* | 5/2019 | Lin | G05F 1/625 | |
| 10,289,780 B1* | 5/2019 | Verma | G06F 30/367 | |
| 10,482,210 B2* | 11/2019 | Wang | G06F 30/392 | |
| 10,564,706 B2* | 2/2020 | Lin | G06F 1/3296 | |
| 10,585,996 B2* | 3/2020 | Chhabra | G06F 30/398 | |
| 10,671,784 B2* | 6/2020 | Wang | G06F 30/367 | |
| 2001/0049815 A1* | 12/2001 | Shinomiya | G06F 30/39 | 716/122 |
| 2002/0065643 A1* | 5/2002 | Hirano | G06F 30/367 | 703/19 |
| 2004/0031008 A1* | 2/2004 | Satoh | G06F 30/327 | 716/113 |
| 2010/0064272 A1* | 3/2010 | Higashi | G06F 30/39 | 716/122 |
| 2014/0181771 A1* | 6/2014 | Sajid | G06F 30/367 | 716/113 |
| 2017/0255732 A1* | 9/2017 | Milor | G11C 29/50004 | |
| 2019/0148284 A1* | 5/2019 | Aipperspach | H03K 19/1774 | 716/120 |

* cited by examiner

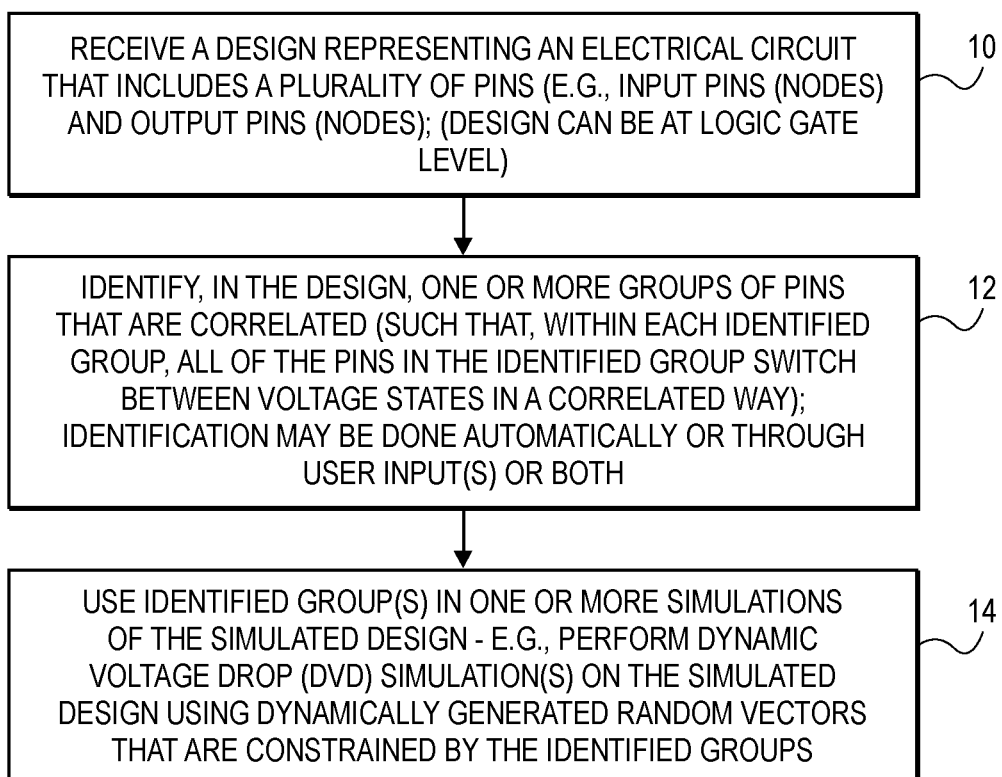

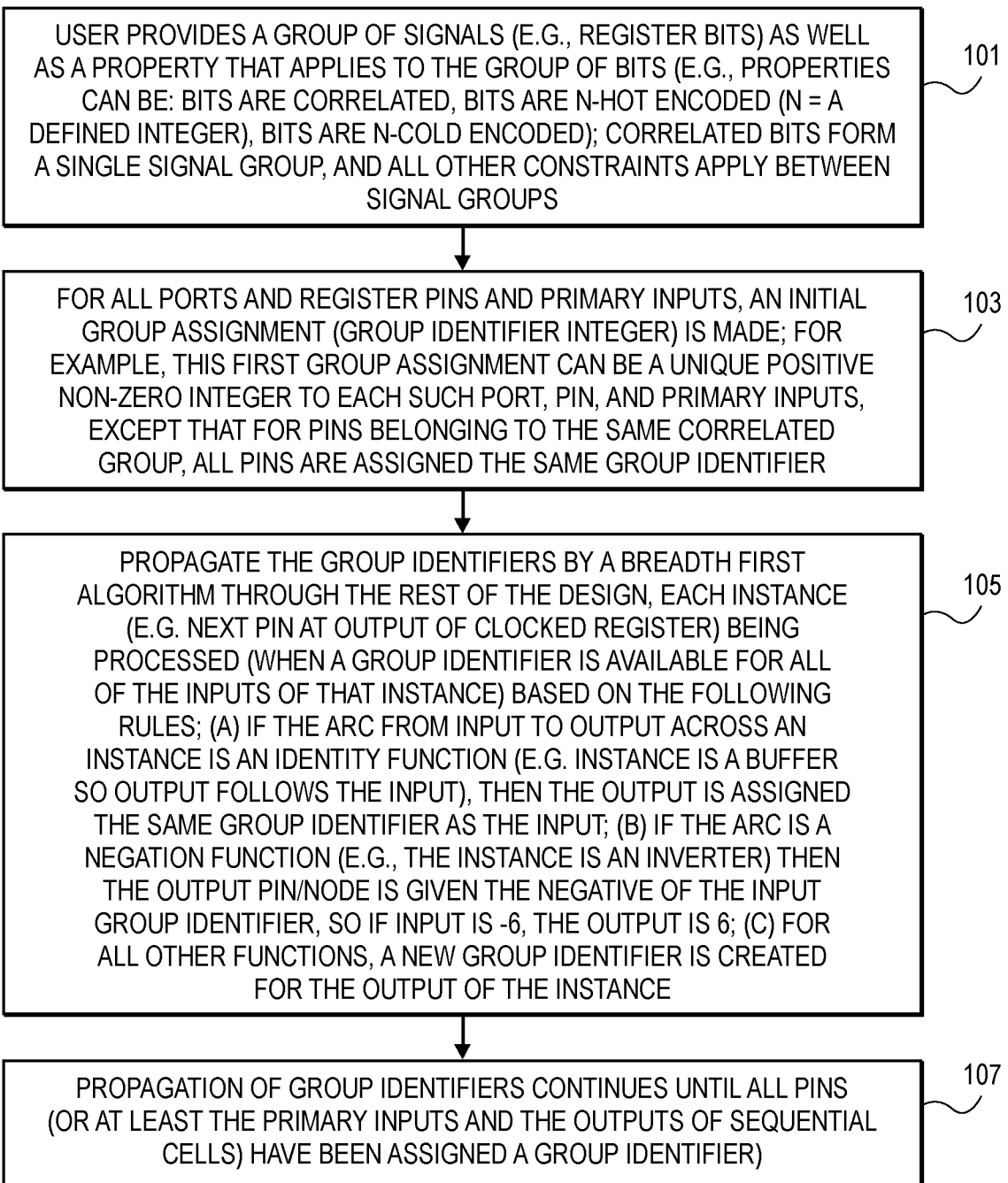

FIG. 5

Toggling in
DVD Simulation

| bit/pin | time 1 | time 2 | time 3 |
|---------|--------|--------|--------|
| 1 | H | H | L |
| 2 | L | H | H |
| 3 | H | H | H |
| 4 | L | H | H |
| 5 | H | H | H |
| 6 | H | L | H |

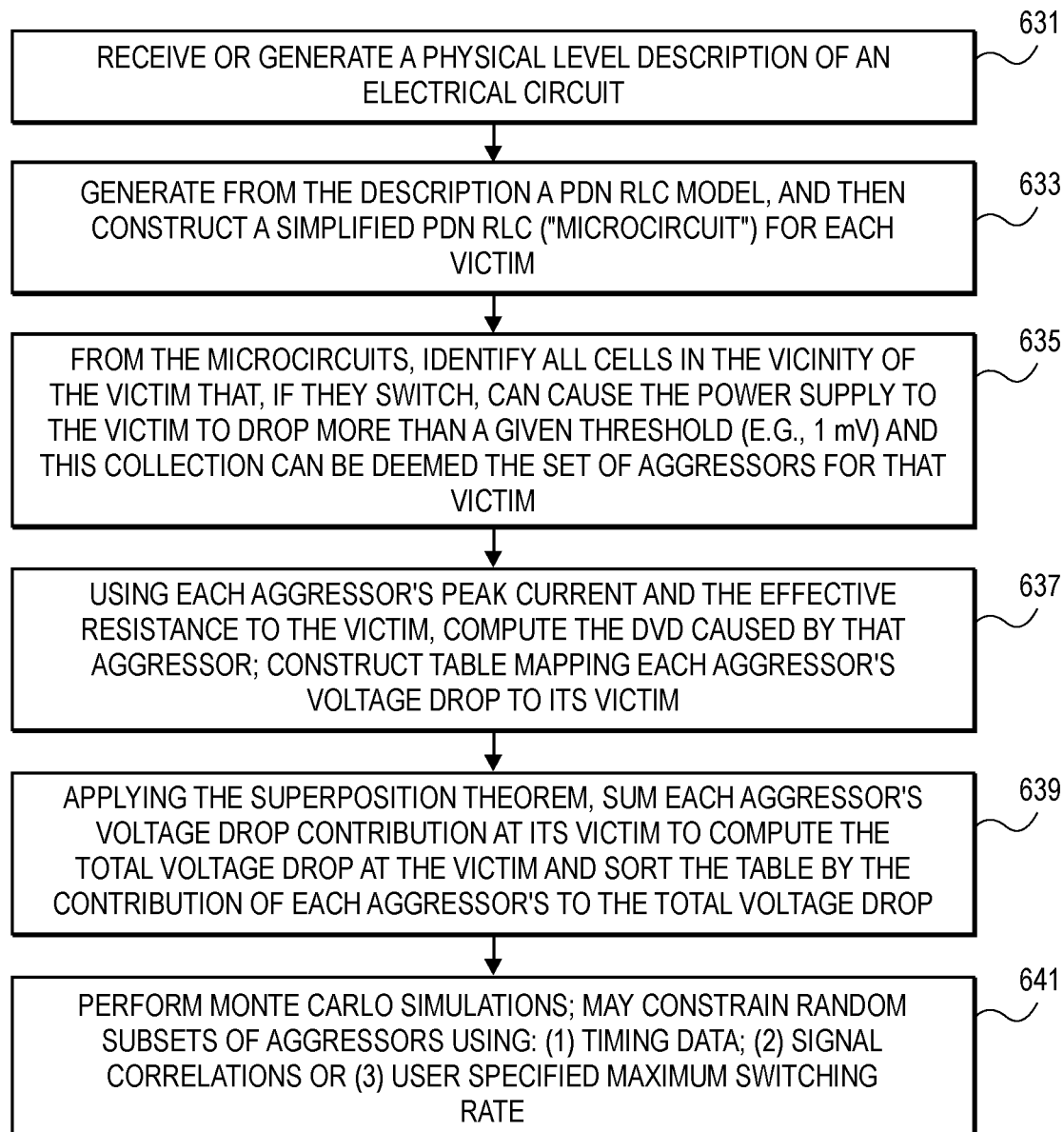

FIG. 10C

Voltage Drop Table — 651

| Victim | Aggressor | Voltage drop |
|--------|-----------|--------------|
| V1 | A1 | 0.015 |
| V1 | A2 | 0.012 |
| V1 | A3 | 0.011 |
| V1 | SUM | 0.038 |
| V2 | A2 | 0.02 |
| V2 | A4 | 0.015 |
| V2 | A5 | 0.01 |
| ⋮ | ⋮ | ⋮ |
| V2 | SUM | 0.056 |

653 → Victim
655 → Aggressor
657 → Voltage drop

DYNAMIC VOLTAGE DROP ANALYSIS WITH IMPROVED COVERAGE

BACKGROUND

The field of this disclosure relates to systems for designing electrical circuits and more particularly to systems that use dynamic voltage drop (DVD) analysis to predict circuit behavior when designing electrical circuits. Dynamic voltage drop analysis is often done to simulate how a power grid or power distribution network in an integrated circuit will perform when data signals switch or toggle between voltage states, such as from high to low states, etc. Often, this switching can cause circuits to consume more power than when the circuit is idle (and therefore there is little switching). This increased power consumption can cause the power grid to deliver less than desired levels of voltage at one or more nodes or pins in the circuit, and this lowered level of voltage can affect the operation of logic circuits to the extent that the logic circuits may not operate correctly or as desired. Thus, circuit designers often use simulation software to perform dynamic voltage drop analysis before they finish the design of an electrical circuit. Dynamic voltage drop analysis typically involves simulating the repeated change over time of various data signals so that over time different data signals are repeatedly toggled to different voltage states to simulate normal operation of the circuit (in which it is expected that the various data signals will change over time due to the normal operation of the circuit). When performing dynamic voltage drop analysis, signals that are to be toggled are identified in a vector that can either be user provided or automatically constructed through a random approach. There are two commonly used approaches to choose signals that are toggled in approaches which use random selection of toggling. In one approach, a purely random selection of signals is used. This can be fast and easy and provide a reasonable representation for full system power. However, purely random selection can lead to toggle selections that would be impossible to occur in the actual design, such as by choosing to signals to toggle in the same direction that are connected by an inversion or that are mutually exclusive. In this situation, randomly selected vectors are pessimistic in that they cause higher dynamic voltage drop versus what would be observed in the real design. In the other approach, randomly selected toggle values are used only for registers and then a timed logical propagation is used to determine which downstream signals will toggle. This alternative approach is very computationally expensive, and due to the nature of random inputs to combinational logic, typically causes the signal toggling to die down after a very limited number of propagation stages. While all such toggle patterns can actually be reproduced in the actual design, they failed to exercise enough of the reachable vector space, leading to this alternative approach as being optimistic versus what will normally be observed in a real design. One flaw that is common to both approaches is that both approaches, by relying on independent random choices for each signal, will fail to catch some very important conditions for dynamic voltage drop analysis, wherein all bits of a logical unit, such as a bus, toggle at once. Having many bits simultaneously toggle is extremely improbable to happen by random choice even though this scenario might be guaranteed to occur in normal operation of the design. Similarly, random choices will fail to account for logical excursions in the vector space, such as n-hot encoded buses or n-cold encoded buses.

Existing dynamic voltage drop simulations perform the voltage drop analysis across the entire integrated circuit (IC), and thus these simulations must be repeated for the entire IC when just a portion of the design has changed and thus any changes in the design will increase the time required to complete the design process by requiring a full dynamic voltage drop simulation again after the change. Moreover, it is not practical with existing software simulators to perform a DVD simulation with full coverage of all of the possible switching conditions affecting any particular instance in a design.

SUMMARY OF THE DESCRIPTION

One aspect of the embodiments described herein can use the identification of correlated groups of signals or pins or nodes within a circuit design to constrain how toggling of signals is performed in a simulation. According to this aspect, pins or nodes within a circuit design are identified as belonging to a correlated group either manually by a user through a user interface or automatically (e.g., without user input) or both manually and automatically. A set of pins or nodes are correlated when they all switch in the same direction (or opposite directions if inverters cause inversions) in response to a decision to toggle one of the pins in the set. For example, if a set of pins are all part of a clock tree that distributes a clock signal through a portion of a circuit through buffers or drivers, then that set of pins will all toggle in the same direction when any one of them toggles in that direction. Similarly, a set of buffers or drivers in series will have a set of pins in the series connection that will all toggle in the same direction when any of them toggle in that direction; when inverters are used (for example, drivers that are inverters) in the series connection, then at least some of the pins will toggle in the opposite direction when one of them toggles in a direction but the pins are still correlated in this series connection. Other examples of a set of correlated pins include pins that are in certain encoded signals such as N-hot encoded signals and N-cold encoded signals. The identification of correlated pins (or nodes) can be used to constrain random signal or pin toggling in, for example, dynamic voltage drop analysis (DVD) that can be performed in a simulation of a circuit design. For example, rather than randomly toggling pins within an identified group that is correlated, the toggling is constrained so that all the pins within the group toggle in the same way due to the correlation. This will reduce the amount of toggling and be more realistic relative to how the circuit would normally operate and thus avoids pessimistic conclusions from a DVD analysis.

An embodiment which can use the identification of groups when performing DVD simulations can include the following operations in a method that can be performed by a data processing system: receiving a design representing an electrical circuit that includes a plurality of pins, the plurality of pins including one or more input nodes and one or more output nodes in the electrical circuit; identifying, in the design, one or more groups of pins that are correlated such that, within each identified group, all of the pins in the identified group switch between voltage states in a correlated way; generating a first set of inputs that represent a set of voltage states for a first subset of the plurality of pins that are not in the one or more groups; and generating a second set of inputs for a second subset of the plurality of pins that are in the one or more groups, the second set of inputs representing voltage states that are constrained by the correlation that is identified for each group in the one or more groups. In one embodiment, the method can further include the operation of: computing a dynamic voltage drop (DVD) simulation for the design based on the first set of inputs and the second set of inputs such that the second subset of the plurality of pins switch between voltage states in a correlated way within each identified group in the dynamic voltage drop simulation. In one embodiment, the operation of identifying the one or more groups can include the operation of: assigning for each group, a group identifier or a negated group identifier to identify all pins in the group will behave the same way in response to a switch between voltage states during the dynamic voltage drop simulation. In one embodiment, the pins within each identified group in the one or more groups do not switch randomly during the DVD simulation because of the identified correlation while pins in the first subset do randomly switch during the DVD simulation. In one embodiment, the first set of inputs includes a first random vector to randomly switch between voltage states for the first subset of the plurality of pins, and the second set of inputs comprises a second random vector that switches each identified group randomly as a group of pins in a correlated way. The first and the second random vectors can be combined into a single vector that specifies toggle decisions for both uncorrelated pins and pins in correlated groups.

In one embodiment, the method can further include the operation of: propagating, for each group, the group identifier through circuit paths in the design to assign pins in the design to the one or more groups and the propagating can also assign identifiers to pins not in any correlated group. The propagating can include, in one embodiment, the use of a breadth first algorithm to propagate, for each identified group, the group identifier. In one embodiment, the dynamic voltage drop simulation can determine a performance or adequacy of a power distribution grid or power network in the design, and the design of the power distribution grid or power network can be revised, prior to fabricating an IC containing the design, based upon the results of the simulation if the performance or adequacy of the power distribution grid is not as desired. In one embodiment, the method can also include the operation of: receiving, from a user through a user interface, a user input that specifies one or more correlated groups of pins in the design. In one embodiment, this user input can specify that a group of pins is one of: (1) correlated and will switch the same way at all times; or (2) N-hot encoded for N pins in the group of pins or (3) N-cold encoded for N pins in the group of pins. In one embodiment, the method can also include the operation of: automatically detecting at least one of: (a) clock trees in the design or (B) bus repeaters in the design. In this example, the automatic detection can include detecting a first element in a first circuit path is an identity function in which an output from the first element always follows an input into the first element and the automatic detection also comprises detecting a second element in a second circuit path is a negation function in which an output from the second element always follows an inverse of an input into the second element. In one embodiment, the method can also include the operation of: determining a correlation relationship exists between two (or more) identified groups such that a selection of a switch between voltage states in the DVD simulation for one of the two identified groups dictates a switch between voltage states for the other of the two identified groups according to the correlation relationship. In this case, the two identified groups share a correlation such that setting a toggle condition for one signal in one of the identified groups determines the toggle condition for signals in the first identified group as well as signals in the second identified group.

Another aspect of this disclosure involves the construction and use of a reduced model, which can be referred to as a microcircuit, for a power distribution network that is used in performing debugging and dynamic voltage drop analyses and simulations. The reduced model is locally accurate around power supply nodes of victim circuit components (which can be referred to as a victim logic element or victim cell), and the reduced model can include only a subset of possible aggressors rather than all possible aggressors in the entire design and yet still preserve all material voltage and current impacts on the victim circuit components but with the benefit that the microcircuit can be simulated many orders of magnitude faster than the original full scale circuit which represents the entire design. A design can be broken into multiple microcircuits, each surrounding a set of one or more victim cells that are affected by a set of aggressors (each of which is a logic element, such as a driver, inverter, etc.), and the multiple microcircuits can provide full coverage of the possible dynamic voltage drops across the entire design.

A method according to this aspect can include the following operations: selecting a first logic element in a design of an electrical circuit, the first logic element directly coupled to a first power supply node that is affected by a set of logic elements that represent aggressors that cause a voltage drop on the first power supply node; selecting a first region in the design, the first region being a portion of the design, and the first region encompassing the first logic element and at least a portion of the set of logic elements (e.g., aggressors) and a power delivery network, which includes the first power supply node, in the first region; computing, for each logic element in the at least a portion of the set of logic elements, a voltage drop at the first power supply node caused by each logic element. The method can further include the operation of: determining whether the first region captures a sufficient set of aggressors that cause a voltage drop at the first power supply node. The method can further include the operation of: enlarging the first region to create a second region in response to determining the first region does not capture a sufficient set of aggressors, the second region being a portion of the design and encompassing the first logic element and at least the portion of the set of logic elements. In one embodiment, the computing can be limited to the first region for the victim and does not extend to the design outside of the first region. In one embodiment, data representing the first region of the design is stored in main or working memory, such as for example the DRAM memory (in the data processing system which performs this method) during the computing to compute the voltage drops while other data representing the remainder of the design is not stored in main memory (e.g., the DRAM memory) during the computing. In one embodiment, the first region can be iteratively enlarged until an enlarged first region captures a sufficient set of aggressors that cause a voltage drop at the first power supply node. In one embodiment of this method, each logic element in the set of logic elements that causes a voltage drop, at the first power supply node, that exceeds a predetermined voltage drop is considered an aggressor that is used in voltage drop simulations, and wherein a sufficient set of aggressors is captured when logic elements at a periphery of the enlarged first region cause voltage drops, at the first power supply node, that are less than a predetermined voltage drop. The predetermined voltage drop can be a predetermined electrical value such as a voltage or in another embodiment can be a current value.

In one embodiment, the computing performed by the method can include the operation of: grounding or soft grounding power supply nodes at a periphery of the first region in a simulation and injecting a simulated known current, such as one amp, on the first power supply node and computing connection resistances along paths in the power delivery network in the first region to derive resistances, and thereby computing voltage drops (V=IR) based on the known current and the derived resistances.

In one embodiment, the enlarged first region can be one of (a) a rectangle, or (b) a polygon having more than four sides, or (c) an arbitrary shape that is enlarged based on convergence data at a periphery of the enlarged first region. In one embodiment, the enlarged first region can be enlarged asymmetrically such that peripheral areas that are farther from convergence are enlarged more than peripheral areas that are closer to convergence in the process of determining whether a sufficient set of aggressors have been captured. In one embodiment, the method can further include the operations of: updating the design within the enlarged first region, the updating comprising one or more of: changing the power delivery network or changing the first logic element or changing the set of logic elements or a combination of these; and computing updated voltage drops for only the updated design in the enlarged first region (while the voltage drops outside of the enlarged first region are not recomputed).

In one embodiment, the first logic element can be selected by a designer using the data processing system, and the data processing system can automatically select the first region.

Another aspect of this disclosure relates to the use of computed data structures containing dynamic voltage drop information which can be used to perform simulations. In one embodiment, a system can determine, for a particular victim, a voltage drop caused by each aggressor element or instance ("aggressor") in a set of aggressors in the design, and the system can create a data structure (for example, a table) that includes, for each victim, at least one of: (1) each voltage drop caused by each aggressor in the set of aggressors or (2) a sum of the voltage drops on the victim caused by all of the aggressors in the set of aggressors. The system can then compute a set of simulations based on random inputs to generate a distribution of possible voltage drops for each victim using the data in the data structure. This set of simulations can for example be a set of Monte Carlo simulations.

In one embodiment, a method according to this aspect can include the following operations: determining a set of one or more victims in a design of an electrical circuit; determining, in a simulation for each victim, a voltage drop caused by each aggressor in a set of aggressors in the design; creating a data structure that includes, for each victim, at least one of: (1) each voltage drop caused by each aggressor in the set of aggressors or (2) a linear sum of the voltage drop on each victim caused by all of the aggressors in the set of aggressors; and computing a set of simulations based on random inputs to generate a distribution of possible voltage drops for each victim based on the data structure. In one embodiment, the set of simulations can be a Monte Carlo simulation, and the random inputs can include data that specifies a toggling of a randomly selected subset of the set of aggressors to switch voltage states in each simulation, wherein the randomly selected subset varies across the set of simulations to generate the distribution of possible voltage drops for each victim. In one embodiment, the randomly selected subset can be constrained by one or more of: (1) a timing relationship between switching times of each victim and switching times of each aggressor in the set of aggressors; (2) one or more identified groups of correlated signals; or (3) an input for the design that specifies a toggling rate or maximum switching rate or desired toggling rate for the design. In one embodiment, the constrained randomly selected subset has fewer aggressors than an unconstrained randomly selected subset. In one embodiment, the data structure can be a table and the method can further include the operation of: determining a peak current for each aggressor to determine a maximum voltage drop at each victim. The method can further include in one embodiment the further operations of: creating, for each victim, a probability distribution function (PDF) based on the distribution of possible voltage drops; and deriving from the PDF one or more statistical values about voltage drops for each victim and deriving a cumulative distribution function (CDF).

In one embodiment, the method can further include the operation of: sorting the table by voltage drops to determine, for each victim, the most significant aggressor. In one embodiment, the linear sum which can be stored in the table can use a superposition theorem to compute the linear sum. In one embodiment of this method, the set of aggressors can be limited to a computed region that surrounds each victim, and the computed region, for each victim, is computed iteratively to capture a sufficient collection of aggressors that cause voltage drops, for each victim, that exceed one or more predetermined thresholds. In one embodiment of this method, the random inputs that are used for the set of simulations are pseudorandom numbers derived from conventional random number generators.

The aspects and embodiments described herein can include non-transitory machine readable media that can store executable computer program instructions that when executed cause one or more data processing systems to perform the methods described herein when the computer program instructions are executed. The instructions can be stored in non-transitory media such as in nonvolatile memory, such as flash memory, or dynamic random access memory (DRAM) which is volatile or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 1 shows a flowchart that illustrates a method according to one embodiment described herein.

FIG. 3 is a flowchart which illustrates a method of constructing groups having correlated signals or pins according to one embodiment.

FIG. 5 shows an example of toggling which can occur in a DVD simulation according to one embodiment.

FIG. 6B shows a slice of the various layers in an integrated circuit which includes the power delivery network, where these layers include metal conductors on the top of each layer as well as conductive vias that provide connections through each layer.

FIG. 10B is a flowchart which illustrates a method which can use such a data structure and one or more microcircuits described herein to derive distributions of voltage drops for a victim.

FIG. 10C shows an example of a data structure which can be used with the methods shown in either FIG. 10A or FIG. 10B.

DETAILED DESCRIPTION

Figure 2A:
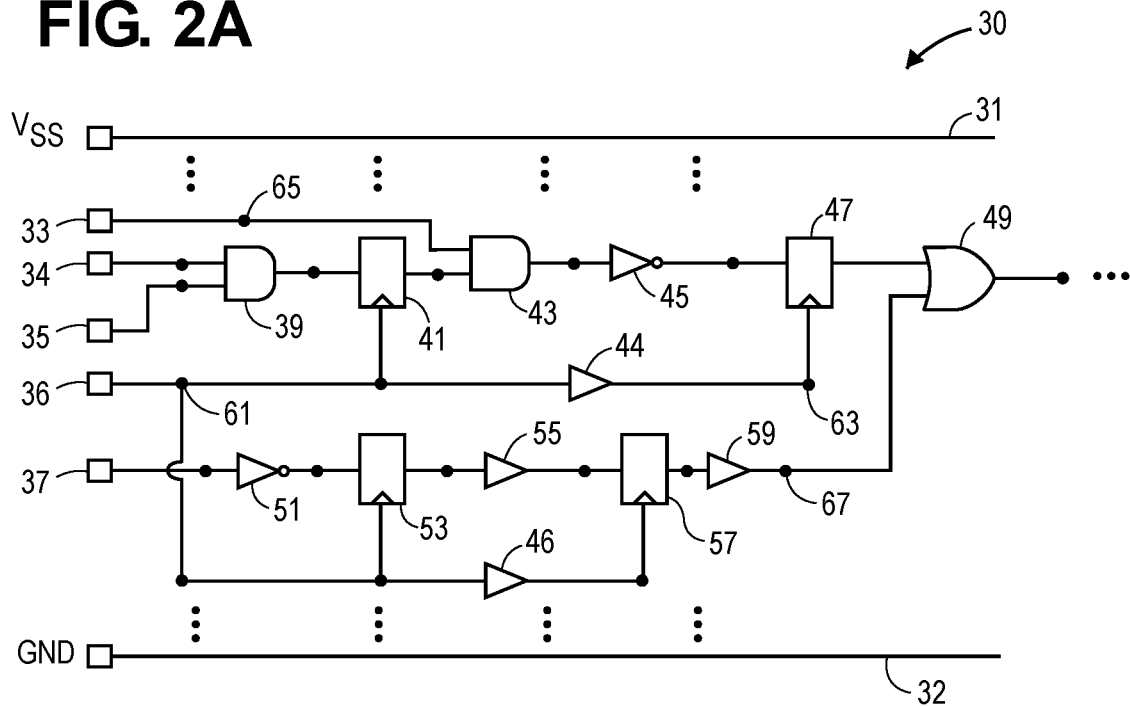
FIG. 2A shows a circuit design that can be analyzed in a DVD simulation according to one embodiment.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

One aspect of the embodiments described herein can use the identification of groups of pins or signals in an electrical circuit to constrain test vectors used to decide which signals to toggle or not toggle in a simulation such as a dynamic voltage drop simulation that can be performed in simulation software that operates on a simulated design of an electrical circuit. In one embodiment, the toggling of pins involves the switching of voltage states such as switching from high to low or vice versa for data signals in the simulated electrical circuit. For example, if a pin in the design was simulated to be at a high voltage state (e.g., Vss) and it was decided to toggle the pin, the pin would switch in the simulation from the high voltage state to the low voltage state (e.g., ground). FIG. 1 shows an example of a method in one embodiment according to this aspect. In operation 10, the simulation software can receive a design that represents an electrical circuit that includes a plurality of pins. The plurality of pins can include input pins as well as output pins, and the design of the electrical circuit can be represented at a logic gate level (e.g., see the circuit 30 in FIG. 2A) in one embodiment. In one embodiment, the input pins can correspond to nodes within electrical circuit and the output pins can also correspond to nodes in the circuit. It will be appreciated that the term nodes can be considered synonymous with the use of the term pins in one embodiment. In one embodiment, those skilled in the art will recognize that certain input pins can be considered to be primary input pins that provide inputs to all other pins in a circuit. In one embodiment, the primary pins can be the ports which are often the bonding pads on the integrated circuit at the periphery of the integrated circuit and those ports are in direct communication with components outside of the integrated circuit. In operation 12, the method can identify, in the design, one or more groups of pins that are correlated such that, within each identified group, all of the pins in the identified group switch between voltage states in a correlated way. In one embodiment, the identification may be done automatically without user input while in another embodiment, the identification may be performed through one or more user inputs provided through a user interface in the simulation software. In another embodiment, the identification may be performed both automatically and also through user input through a user interface. Further information about the automatic identification of such groups will be provided further below. The identification through user inputs can include, for example, allowing the user to specify a set of pins as being a correlated group or allowing the user to identify a set of pins as having been encoded using certain encoding schemes which provide correlated pins or signals, such as N-hot encoded bus schemes or N-cold encoded bus schemes. In one embodiment, automatic identification can be restricted to features in a circuit design that are implicit from the circuit's topology and function and all other constraints are to be provided by the user (e.g. circuit designer). In one embodiment, once buses are discovered (either automatically or by user provided information), a worst case assumption can be used that all bits in a bus are correlated (this assumption can be considered conservative and hence safe). User provided constraints can be provided to (1) indicate that the design operates under a tighter activity constraint, which will limit the amount of activity assumed (and thus lower implied maximum power) and (2) remove the false failure (dynamic voltage drop or timing) caused by the safe, but incorrect, assumption of all bits switch together. Once the groups of correlated pins are determined or identified they can be used in further analysis or simulation of the design, and this is shown in FIG. 1 as operation 14.

In operation 14, the identified groups can be used in one or more simulations of the simulated design. For example, simulation software can perform dynamic voltage drop simulations on the simulated design using dynamically generated random vectors that are constrained by the identified groups. For those pins which are not in any identified groups, the toggling can directly use conventional random values in the random vectors and signals on such pins will toggle based on the random values in the vectors. On the other hand, pins within each identified group will toggle (or not toggle) as a group rather than separately for each pin within the group based upon the correlation or relationship between each of the pins in each of the identified groups of pins. For example, pins in a clock tree will toggle as a group rather than randomly; thus when a primary pin in a clock tree toggles, then all pins in the clock tree will toggle in the same direction and if the primary pin does not toggle, then no pin in the clock tree will toggle. Similarly, in a series of buffers coupled in series, if the primary input pin to the series toggles then all pins in the serial connection will toggle, and if the primary input pin to the series does not toggle that all pins in the serial connection will not toggle. The control of toggling based on the identified groups will reduce the pessimism that is often found in standard random vectors used for DVD simulations. This pessimism often results in unnecessary modifications to the power grid or power distribution network on an integrated circuit, and these unnecessary modifications can be eliminated by the use of one or more embodiments described herein. The embodiments described herein can also be used to perform timing and voltage analysis using the constraints imposed by the identified groups.

FIG. 2A shows an example of a circuit 30 which will be used to describe the construction of groups that are identified as having correlated pins. The circuit 30 includes a power grid or power distribution network which includes power line 31 and power line 32. In one embodiment, power line 31 can distribute the voltage Vss while power line 32 can distribute the voltage GND (ground). It will be appreciated that a typical integrated circuit includes many such power lines dispersed in a network or grid to distribute power to the logic circuits or logic elements such as AND gates, OR gates, NAND gates, NOR gates, inverters, D flip-flops, and other known logic circuits or logic elements used in integrated circuits. It will be appreciated that the power lines 31 and 32 are connected to individual components (e.g., transistors) within each of the logic circuits to provide power to those individual components, and these connections are not shown in order to provide an uncluttered view of the circuit 30. The circuit 30 includes primary input pins 33, 34, 35, 36, and 37. Each of these primary pins feed inputs to other pins in the circuit including for example pins 63 and pin 67 as well as pins 61 and 65. Input pins 34 and 35 provide inputs to the AND gate 39, and input pin 37 serves as an input to the inverter 51. Pin 65 is connected to the primary input pin 33, and pin 65 is an input to the AND gate 43. The circuit 30 also includes D flip-flops 41, 47, 53, and 57. Each of these D flip-flops has a clock input coupled to the primary input pin 36. It should be apparent that primary input pin 36 feeds a clock tree which provides the clock signals to each of the D flip-flops 41, 47, 53, and 57. The circuit 30 also includes inverters 45 and 51, and the circuit 30 also includes buffers 44, 46, 55 and 59. The output from the D flip-flop 47 and the output from the buffer 59 are provided as inputs to the OR gate 49 which provides the final output from circuit 30, although it will be appreciated that the final output from circuit 30 may be provided to other circuits in the integrated circuit which includes circuit 30.

Figure 2B:
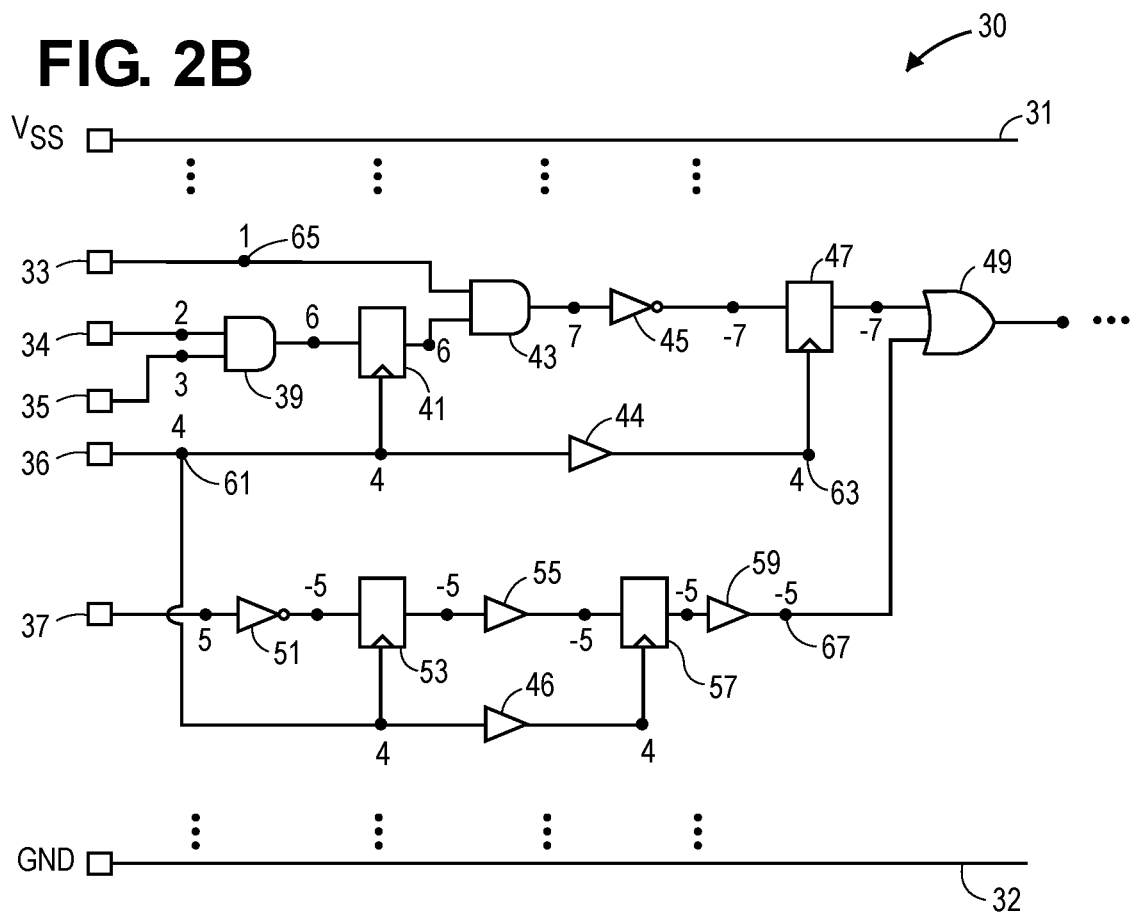
FIG. 2B shows the circuit design of FIG. 2A after two groups have been identified as having correlated pins according to one embodiment.
Figure 4:
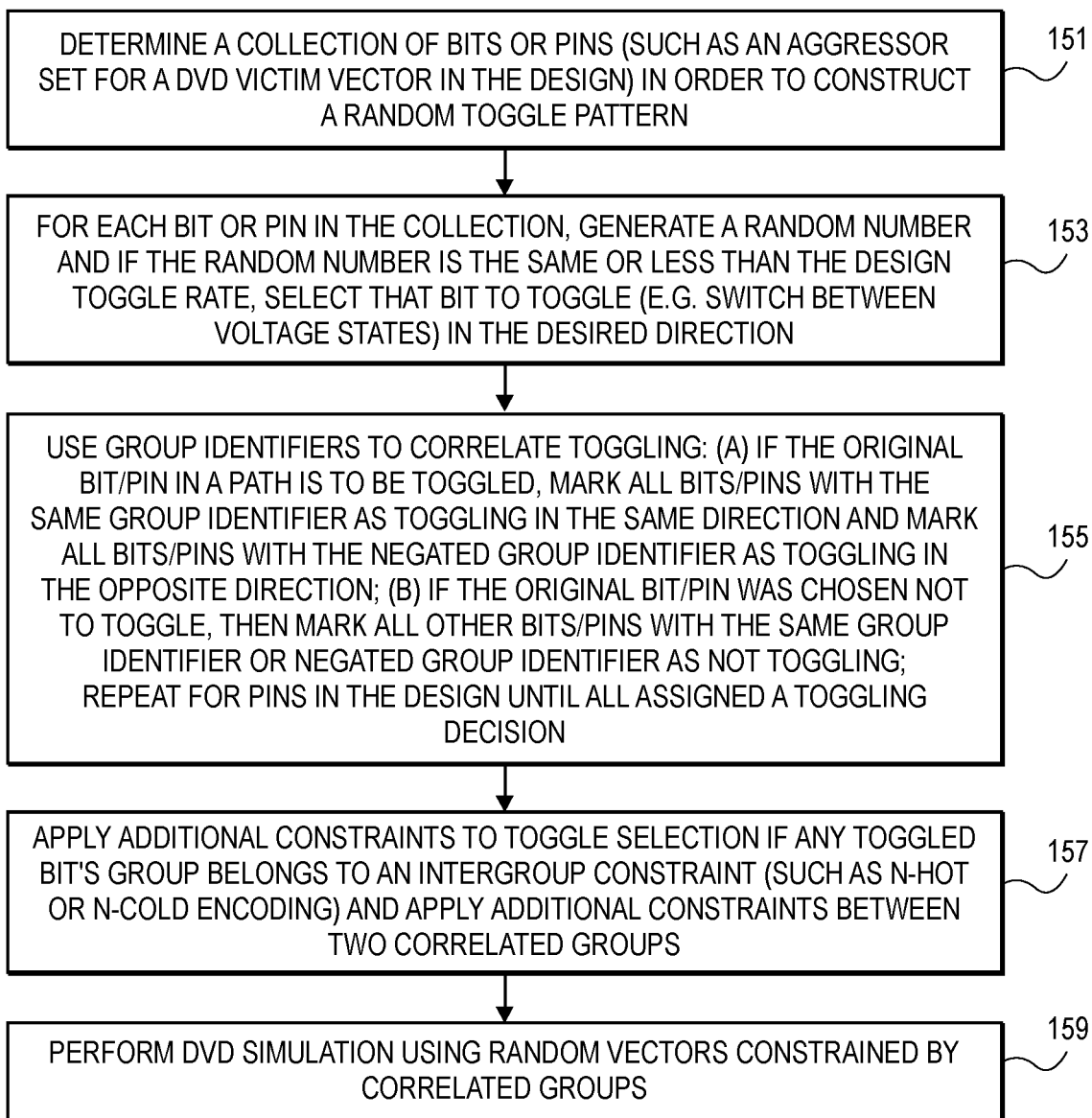
FIG. 4 shows a flowchart that shows a method for using the correlated groups to provide an analysis of a circuit design, such as a dynamic voltage drop analysis or simulation.

A more detailed method for constructing identified groups according to one embodiment will now be described while referring to FIG. 3. The method shown in FIG. 3 can represent an implementation of operation 12 shown in FIG. 1. In operation 101 in FIG. 3, a user can provide or identify a group of signals, such as register bits, and can specify a property that applies to the group. For example, the user can specify that the group is correlated in their switching properties (e.g., they switch voltage states in a correlated way during normal operation and do not independently switch voltage states). As another example, the user can specify the group is correlated by an encoding scheme such as an n-hot encoded scheme or an n-cold encoded scheme. Once these groups are identified by the user (e.g., through a user interface), they can be treated as a correlated group of pins and use the methods described relative to FIG. 1 or FIG. 4 (to be described below). While operation 101 emphasizes user input to identify correlated groups of pins, the embodiments described herein can also perform automatic group identification as described further below (e.g., in operation 105 and in the example shown in FIG. 2B). In one embodiment, the method shown in FIG. 3 can use both user inputs to identify correlated groups of pins and also use automatic identification of correlated groups; in another embodiment, the method shown in FIG. 3 may use user inputs without using automatic identification or may use automatic identification without using user inputs to identify correlated groups. In operation 103, an initial group assignment can be made for a selected group of pins such as all ports and primary inputs; in one embodiment, the selected group of pins is less than all of the pins in the design. In one embodiment, the initial group assignment can be performed by assigning a unique positive non-zero integer to each port and primary input. A port in this embodiment can be a bonding pad which is an external input pin or output pin to allow the electrical circuit in the design to be connected to components outside of the integrated circuit. In the example shown in FIGS. 2A and 2B, the primary input pins are pins 33, 34, 35, 36, and 37. Each of these pins can be assigned a group identifier as part of operation 103 and the initial group number can be a unique positive non-zero integer. In the example shown in 2B, the primary input pin 33 is assigned group number 1 as shown by pin 65. The primary input pin 34 is assigned the group identifier number 2, and the primary input pin 35 is assigned the group identifier number 3. Primary input pin 36 is assigned group identifier 4, and primary input pin 37 is assigned group identifier 5. After the initial group assignments are completed for at least the primary input pins, then the group identifiers can be propagated through the design in operation 105. In operation 105, the propagation of the group identifiers can be performed by a breadth first algorithm through the rest of the design, wherein each instance, such as the next logic element in a path, is processed based on a set of rules. The breadth first algorithm can be one of the breadth first algorithms that are known in the art and can be used to propagate the group identifiers by the use of the following rules: (a) if the arc across an instance (e.g., a logic gate) from the input of the instance to the output of the instance is an identity function then the output is assigned the same group identifier as the input; this can occur when the instance is a buffer so the output always follows the input; (b) if the arc is a negation function, such as the instance is an inverter, then the output pin at the instance is given the negative of the input group's identifier so for example if the input is −6 then the output is 6; (c) for all other functions, a new group identifier is created for the output of the instance. These three rules can be seen in the propagation of group identifiers which is shown in FIG. 2B. For example, the signal at pin 61 has been assigned a group identifier of 4, and this group identifier is propagated through two instances shown as buffers 44 and 46, where these instances provide the identity function so that pin 63 is assigned group identifier 4 and the other pins along the path of that signal are also assigned a group identifier of 4. The propagation of group identifier 5 begins at the inverter 51 which provides a negation function and thus the negative of that group number is propagated through the rest of the series connection through the D flip-flops 53 and 57 and the buffers 55 and 59 to arrive at pin 67 which is assigned a group identifier of −5 as shown in FIG. 2B. The primary inputs 34 and 35 are applied as inputs to the AND gate 39, and the AND gate 39 does not produce an identity function and does not produce a negation function and thus the output from AND gate 39 has a new group identifier (group identifier 6) that is different than the group identifiers of the two inputs to the AND gate 39. Similarly, the output from the AND gate 43 has a new group identifier (7) which is propagated through the inverter 45 and then to the D flip-flop 47 to provide an input (which has a group identifier of −7) to the OR gate 49. Operation 105 can continue in operation 107 in order to propagate the group identifiers until all pins have been assigned a group identifier or at least until the primary pins and outputs of all sequential cells (such as D flip-flops) have been assigned group identifiers. At this point, the simulation system can use the identified groups to perform analysis of the electrical circuit which is simulated in the simulation system. This analysis can include simulation of dynamic voltage drop by using random vectors which are constrained by the identified groups. FIG. 4 shows an example of a method which can use these identified groups.

FIG. 4 shows a method in one embodiment which can use the identified groups to perform dynamic voltage drop simulations or timing/voltage simulations or other analyses. The method in FIG. 4 can begin in operation 151 in which a collection of bits or pins are determined in order to construct a random toggle pattern. In one embodiment, the collection of pins can be the pins in an aggressor set for a DVD victim vector in the design. In another embodiment, the collection of pins can be all of the primary input pins in the design instead of just a portion of the pins in the design such as an aggressor set which can be just a portion of all of the pins in the design. Then in operation 153, for each bit or pin in the collection determined in operation 151, a random number can be generated in order to determine whether or not to toggle the pin from the prior state of the pin. For example, if the pin under consideration in operation 153 was previously in a high-voltage state and the decision is to not toggle the pin, then the pin will remain in a high-voltage state for the next stage in the voltage drop analysis in the simulation. On the other hand, if it is decided to toggle the pin then the pin will switch to a low voltage state for the next voltage drop stage in the simulation. In one embodiment, determining whether or not to toggle the pin can be based upon a random number which is compared to a threshold such as a design toggle rate. If the random number in one embodiment is the same or less than the design toggle rate, then the bit is selected to toggle which will cause a switch between voltage states in a desired direction. If the pin is not part of a correlated group which has been identified using, for example, the method of FIG. 3, then the pin will toggle based upon the random number generated in operation 153. On the other hand, if the pin is part of a correlated group which has been identified using the one or more embodiments described herein, then operation 155 is performed. In effect, the toggling of pins in a group occur as a group as opposed to pins within a group such that the pins in the group are toggled in a correlated way and not randomly within the group. As shown in operation 155 in FIG. 4, if the original bit or pin in a path is to be toggled, then all bits and pins with the same group identifier are marked as toggling in the same direction while all pins with the negated group identifier will toggle in the opposite direction. If the original bit or pin was chosen not to toggle then the method can mark all other bits or pins with the same group identifier (or negated group identifier) as not toggling. Referring back to FIG. 2B, if a decision is made to toggle pin 37 then pin 67 will also toggle because pins 37 and 67 are in the same correlated group that has been identified using the embodiments described herein, and if a decision is made to not toggle pin 37 then pin 67 will also not toggle because pins 37 and 67 are in the same correlated group which has been identified. Operations 153 and 155 can be applied repeatedly over time until all pins in the design are assigned a toggling decision for the purpose of the DVD simulation. The results of operations 153 and 155 can produce a set of toggling decisions which represent the different toggle states over time during a particular DVD simulation, and this is shown in FIG. 5 for 6 different pins over three different timeslots during the DVD simulation. In one embodiment, the timeslots time 1, time 2, and time 3 can be consecutive times during the simulation and represent the toggling between voltage states for the six different pins over those consecutive timeslots. Referring back to FIG. 4, in operation 157, the method can apply additional constraints to the toggle selection if any of the bits in the group belong to an intergroup constraint, such as an n-hot or n-cold encoding scheme. These encoding schemes, as is known in the art, dictate the number of bits which can toggle in the scheme between successive states and thus this intergroup constraint must be applied for pins that are in such a scheme. In addition, operation 157 can also apply additional constraints based upon two or more identified groups which are correlated with each other. It is possible that two different identified groups, each of which are correlated within their own group, are also correlated with another group which has been identified. Thus, the selection of a particular toggle state or toggle decision for one pin in one of the identified groups can dictate the selection of toggle decisions or toggle states for other pins within the same group and also within other groups that are correlated with the first group. In one embodiment, operation 157 can enforce or constrain switching or toggling between two such correlated groups. As an example of two different identified groups that are correlated, consider two different blocks that have a similar structure which includes a set of m outputs from a 1-hot multiplexor selector, where for the m outputs, only one of the m outputs can switch at one time. However, the second of the two blocks (due to system constraints or input conditions) can switch at the same time with the first block (of the two blocks) only 50% of the time. That is, with a 0.5 probability, both blocks are enabled (and only one of their m outputs can switch) and with the remaining probability only one block is active. Within each bloc, the pins (m outputs) are correlated by a 1-hot encoding scheme but between the groups there is known, probability based, correlation. Then in operation 159, the system can perform an analysis, such as DVD simulation using the random vectors which have been constrained by the correlated groups. Thus, the DVD simulation can eliminate toggling which would not occur in the normal circuit thereby making the DVD simulation more realistic and avoiding a pessimistic assessment of the power grid or power distribution network in the simulated design (when the pessimistic assessment is not realistic).

Figure 6A:
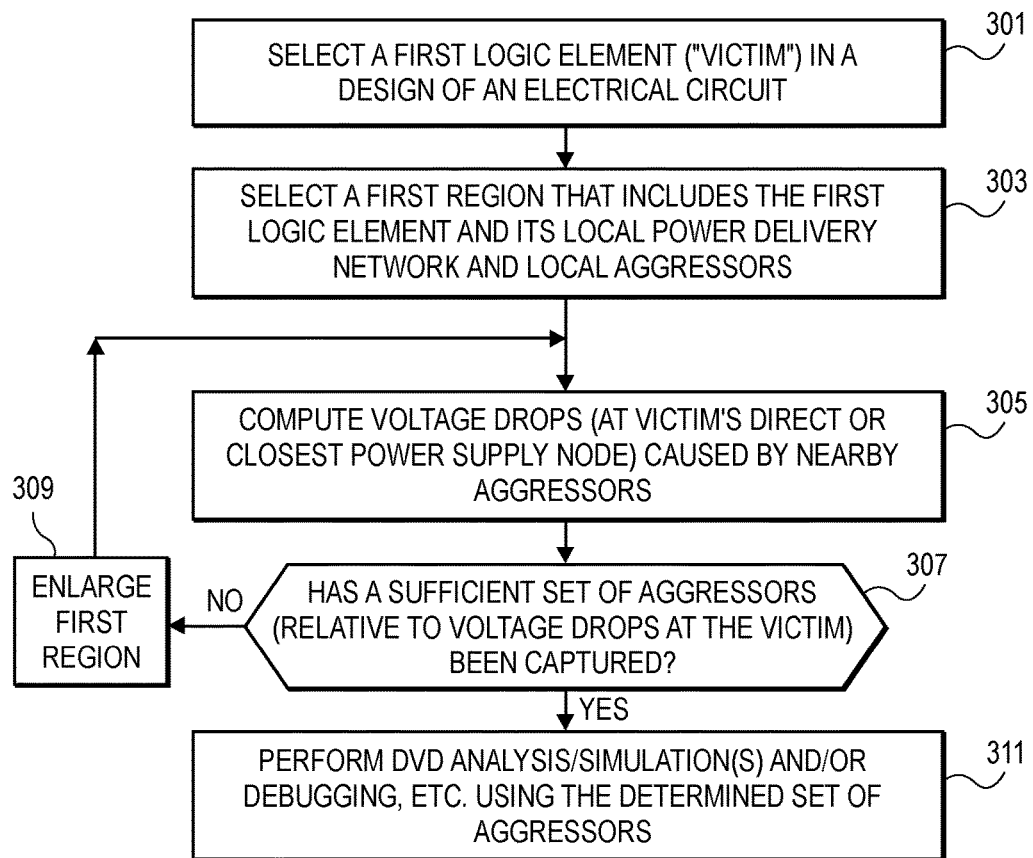
FIG. 6A shows a flowchart which illustrates a method according to an aspect which can use a microcircuit.

An aspect of this disclosure relates to methods for creating one or more portions (each of which can be referred to as a microcircuit) of a design around the victim (or power supply pin of the victim) and using these portions to capture a sufficient, but limited, number of possible aggressors of the victim that cause appreciable voltage drop on the victim. These portions can be referred to as microcircuits. These methods can provide computationally efficient approaches to dynamic voltage drop simulations or analyses and yet still be accurate. Each of these portions can be started at a predetermined size and then enlarged in an iterative process until the method determines that a sufficient set of aggressors that can cause appreciable voltage drop on the victim have been captured in the method. The power delivery network or power grid of the design can be considered as a mesh of resistive (R), inductive (L), and capacitive (C) elements, and with current fabrication processing at very small geometries, the resistance of conductors can be large at lower levels of metallization, and it is these lower levels of metal in the integrated circuit that connect to the individual cell instances such as logic elements in the design. The top layers of metal are much wider and thicker and have much lower resistivity than the lower levels of metallization. The various layers of the power delivery network or power grid are interconnected by vertical connectors which are known as vias. Due to this mesh structure, the current drawn by any particular cell will primarily be supplied by the parts of the grid or power delivery network that are physically close by, with this supplied current across each element of the grid rapidly vanishing as we get further from the point of current demand. Therefore, to get an accurate enough simulation of the ability of the power grid or power delivery network to supply power to an instance (for example a victim), one approach can be to simulate a limited area of the RC mesh of the power delivery network that is local to that particular instance. This limited area also automatically defines the number of instances (for example, a set of aggressors) whose switching activity could have a measurable impact on the supply seen by the victim. Moreover, due to the symmetry in the circuit, the demand an instance places on the power delivery network is also the perturbation that instance causes on the supply seen by all of its neighbors. As the power delivery network is passive (RLC only, no active elements), one or more of the methods described herein can use the superposition theorem to sum the perturbations caused by each instance in the neighborhood of a victim to compute the total effect upon the victim from various permutations of switching activity of its neighbors. This can be done efficiently as it is purely a linear computation process in the number of aggressors. FIG. 6A shows an example of a method which can use one or more portions or regions of a design when preparing to perform all DVD simulations or analysis.

Figure 6B:
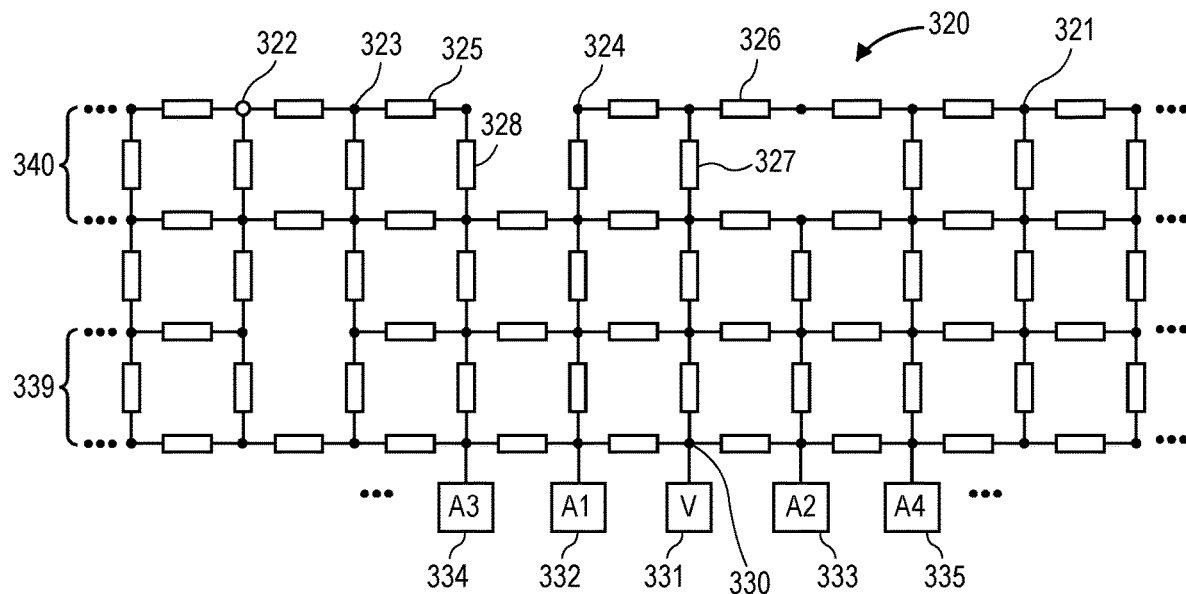
FIG. 6B shows an example of a power delivery network.
Figure 6C:
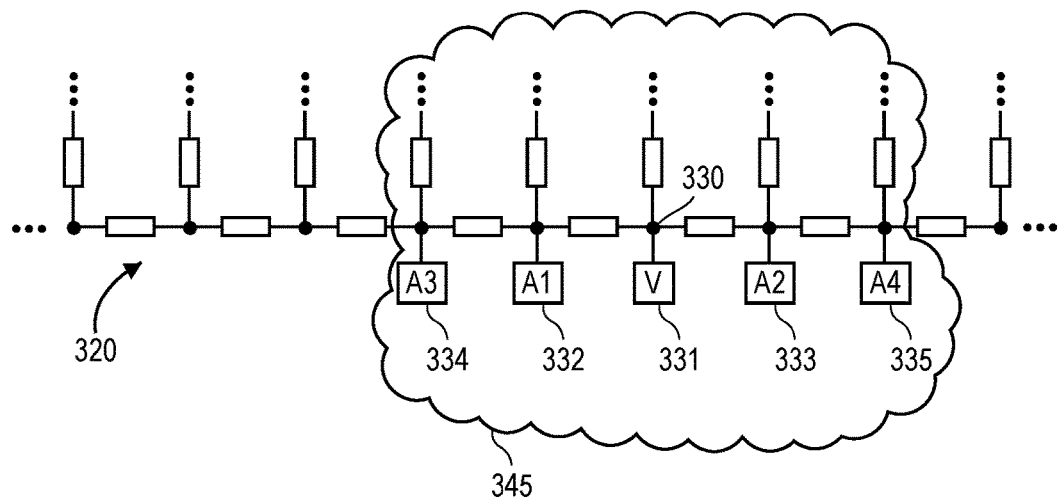
FIG. 6C shows an example of a first region which is selected according to one method described herein.
Figure 6D:
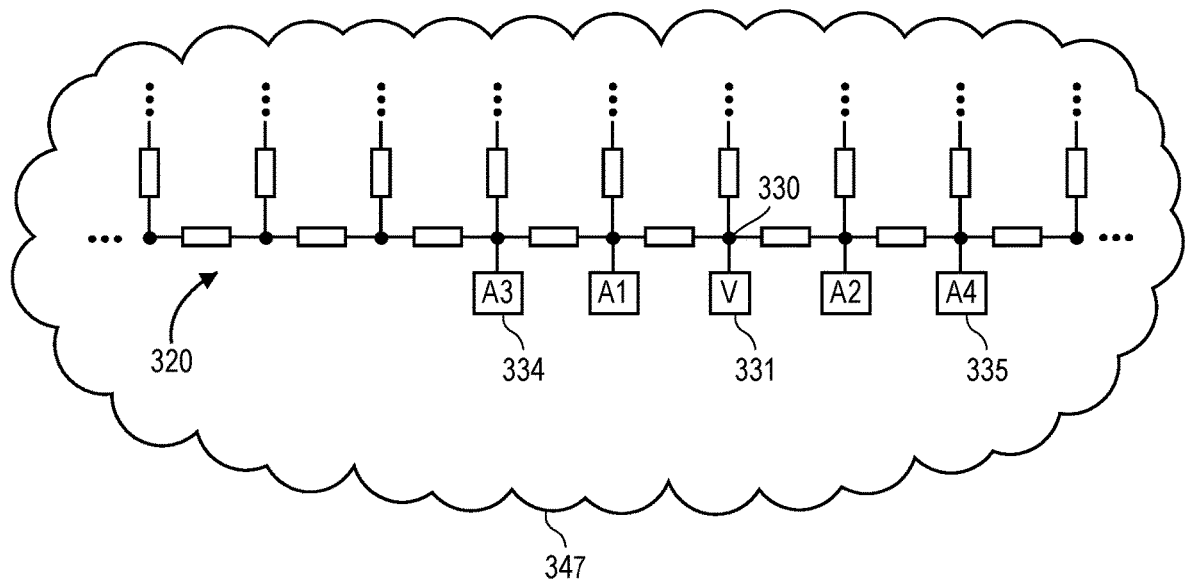
FIG. 6D shows an enlarged first region after it has been determined that a sufficient set of aggressors has not yet been captured in the method.
Figure 7A:
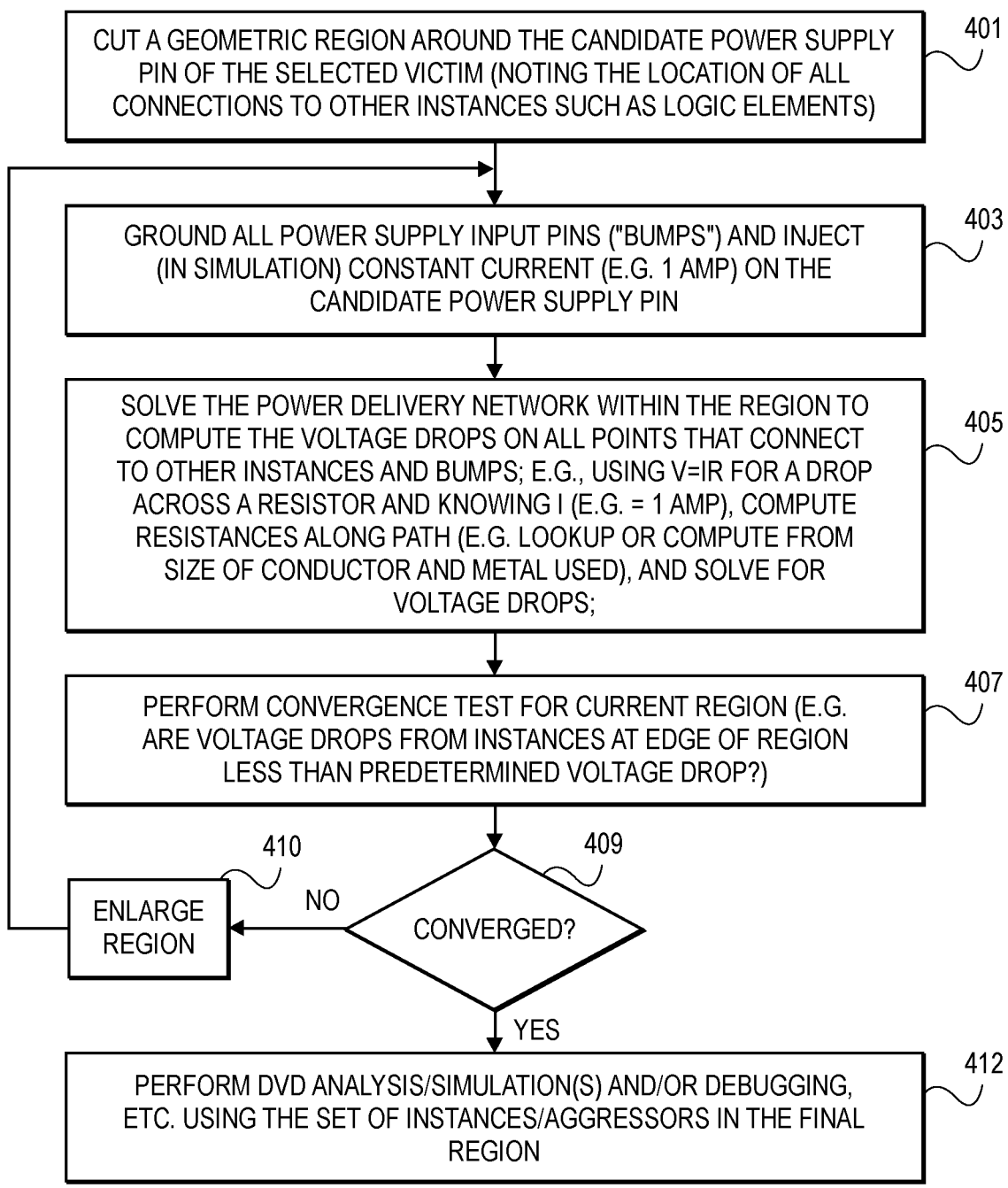
FIG. 7A is a flowchart which illustrates a method according to the aspect in which a microcircuit is used to generate one or more simplified models for a power distribution network.

The method shown in FIG. 6A can begin in operation 301, and in that operation 301, the user or the system can select a first logic element in a design of an electrical circuit, where the first logic element can be a victim or cell that is considered a victim. For example, a user may recognize that a particular logic element in a portion of the design may be prone to race conditions or other timing problems which can be exacerbated by noise on the power distribution network that is caused by switching of aggressor components that are near to the particular logic element. Thus the user may recognize that the particular logic element should be treated as a victim and analyzed using simulations of dynamic voltage drop to determine whether there is too much noise on the power distribution network which could prevent the victim from operating properly. Alternatively, the system may select the victim in a particular region based upon geometry or topology information which is available to circuit simulation software in many cases. In operation 303, the user or the system can select a first region, which can be referred to as a microcircuit, that includes the first logic element and also includes its local power delivery network (e.g., power delivery network 320 shown in FIG. 6B) and local aggressors, but the first region does not include the entire design and is only a portion of the entire design. Examples of a first region will be described below in conjunction with FIG. 6C. Then in operation 305, shown in FIG. 6A, the system can compute the voltage drops at the victim's direct power supply node (or closest power supply node) caused by nearby aggressors in the selected region (but ignoring and not computing voltage drops from aggressors outside of the selected region). In the example shown in FIG. 6C, the victim 331 is within a first region 345, and aggressors 332, 333, 334, and 335 are also within the first region 345, and these aggressors can cause a voltage drop on the pin 330 when the aggressors switch between voltage states during their normal operation. In one embodiment, operation 305 can compute voltage drops using information about the conductors in the power delivery network such as the type of metal, the thickness and width of the metal, etc. This information can be used, as is known in the art, to compute resistances along the connection paths within the power delivery network. The method shown in FIG. 7A provides more information about how the voltage drops can be computed in one embodiment using a simulated constant current of a known value. After the voltage drops have been computed in operation 305, the system can then determine in operation 307 whether or not a sufficient set of aggressors have been captured for purposes of dynamic voltage drop simulations or analyses. If a sufficient set of aggressors has been captured, then processing can proceed to operation 311. In operation 311, the system can perform one or more simulations or analyses, such as DVD simulations or analyses and/or debugging, etc. using the determined set of aggressors. These simulations or analyses can use the other aspects described herein, such as the use of identified groups to constrain random toggling or the use of Monte Carlo simulations, etc. If, on the other hand, operation 307 determines that a sufficient set of aggressors has not been captured, then processing proceeds to operation 309 in which the first region is enlarged to capture an enlarged set of aggressors which can then be further processed in operation 305 after the first region has been enlarged as shown in FIG. 6A. In one embodiment, the first region can be iteratively enlarged over time until a sufficient set of aggressors have been captured. FIG. 6D shows an example of an enlarged first region 347 which is enlarged from the first region 345 shown in FIG. 6C as a result of operation 307 determining that an insufficient set of aggressors have been captured in the method shown in FIG. 6A. Further information about determining whether or not the set of aggressors is sufficient is provided below in conjunction with the method shown in FIG. 7A.

The method shown in FIG. 6A can be used to create a reduced model of a power delivery network and in particular a reduced RLC model for the power delivery network when determining sets of aggressors for each selected victim. Each reduced RLC model can be referred to as a microcircuit which can be used in operation 311 shown in FIG. 6A or operation 412 shown in FIG. 7A. FIG. 6B shows an example of a power delivery network (PDN) 320. In the example of FIG. 6B, three layers are shown but it will be understood that the design, in the form of an integrated circuit, can have many more layers which include a top layer and a bottom layer, such as top layer 340 and bottom layer 339. The bottom layer 339 is next to the logic elements such as inverters, buffers, and other active elements that include transistors to perform logic operations or to control or generate signals in the design. For example, the logic elements can include a victim 331 which is coupled to receive power through a pin 330. The logic elements can also include aggressors 332, 333, 334, and 335 (as well as other aggressors not shown on both the left and right side of the PDN 320). Each of these aggressors can be logic elements that can switch between voltage states and therefore cause voltage drops on the pin 330 when the aggressors switch. The rectangles in the power delivery network 320 represent connection resistances or resistors such as connection resistance 325 and connection resistance 326. The connection resistances are due to the inherent resistance in a conductor. The power delivery network 320 also includes vias that also provide resistance or a connection resistance, such as via 328 and via 327. The pins, such as pins 323 and 324, represent connections from one layer to a layer below through the vias. The connection to a power supply is through one or more nodes on the top layer, such as power supply node 322 and power supply node 321 which can be referred to as "bumps". It is these nodes that provide power into the power delivery network, and these nodes are remote from the logic elements (such as victim 331 and aggressors 332, 333, etc.) that are below the bottom layer.

The method shown in FIG. 7A shows another embodiment which can be used to construct and use one or more microcircuits for the purpose of performing DVD simulation or analysis or debugging of a power distribution network. In operation 401, the system or the user can form or cut a geometric region around a candidate power supply pin of the selected victim. In the example shown in FIG. 6C, the candidate power supply pin of the selected victim is the pin 330 which provides power directly to the victim 331. In operation 401 the system can note the location of all connections to other instances, such as neighboring logic elements which in the example shown in FIG. 6C includes aggressors 332, 333, 334, and 335. The geometric region can be cut in a variety of shapes; for example the cut or geometric region can be a rectangular shape or other polygons, and these polygons can resemble an impact zone which is determined using the method shown in FIG. 7A. It will be understood that the cut of the geometric region is performed in one embodiment in software which has simulated the design at a physical level, and the operations in FIG. 7A can also be done in the same software when it calculates voltage drops and performs convergence tests and later also performs one or more DVD simulations or analyses and/or debugging. In operation 403, the method can ground all power supply input pins ("bumps") and inject (in the simulation) a constant current of a known value, such as one (1) amp, on the candidate supply pin. This allows the method in operation 405 to solve for the voltage drops within the geometric region that was cut in the power delivery network. In one embodiment, the operation 405 can be a resistive solve which computes the voltage drops by computing the resistances in the connection resistances of the power delivery network around the selected victim and the aggressors in the geometric region formed by the cut in operation 401. The resistances of the connection resistances can be computed through a query or lookup operation on a full design parasitic extraction database or data structure that includes information about the design of the electrical circuit. The voltage drop, V=IR, can be computed along the paths in the power delivery network using the known injected current (I) and the computed resistances (R). Thus, operation 405 can compute the voltage drops on all points that connect to the other instances (aggressors) and bumps and thereby determine a table which can be used (as described further below) during the analysis or simulations in, for example, operation 412. In one embodiment, the set of aggressors that produce voltage drops at the victim that are greater than a predetermined voltage drop (e.g. 10 mV) are considered to be within an impact zone in that these aggressors have an appreciable impact on the selected victim. The superposition theorem can be used to sum the voltage drops caused by each aggressor in the neighborhood of the victim to compute the total effect upon the victim. Then operation 407 can be performed to determine whether or not the current region has captured a sufficient set of aggressors. For example, operation 407 can perform a convergence test for the current region by examining the periphery of the region to determine whether, for example, voltage drops (at the victim) from aggressors at the edge of the region are less than a predetermined voltage drop. If operation 409 determines that the region has converged to an adequate solution then processing proceeds to operation 412. On the other hand, if the solution has not converged as determined in operation 409, then the current region is enlarged in operation 410 and processing reverts back to operation 403 as shown in FIG. 7A. FIG. 6D shows an example of how the prior region is enlarged to create an enlarged region which is then used in further processing in operation 403. FIG. 8B shows an example of how the region can be enlarged in an alternative embodiment in which the region is enlarged asymmetrically. Operations 407 and 409 can perform the convergence testing at the edge of the current region or the periphery (e.g. perimeter 455 in FIG. 8A) of the current region by examining voltages and/or currents at the edge or periphery to determine whether or not a sufficient set of aggressors has been captured by the current region. In one embodiment, convergence can be determined by observing the voltages in the impact zone (e.g., at the periphery of the impact zone) have not changed appreciably between growth iterations. Any change less than a predetermined voltage can be considered a small enough change that shows that convergence has been established and the region does not need to be grown any larger. Alternatively, if the sum of currents at the edge of the region is smaller than a predetermined precision threshold, the construction of the region can be considered converged and thus the region does not need to be grown any larger. After it is determined that the microcircuit has properly converged to an adequate solution for the set of aggressors for a particular region or microcircuit, operation 412 can be used to perform one or more DVD simulations or analyses and/or debugging, etc. using the set of aggressors from the final region or microcircuit.

Figure 8A:
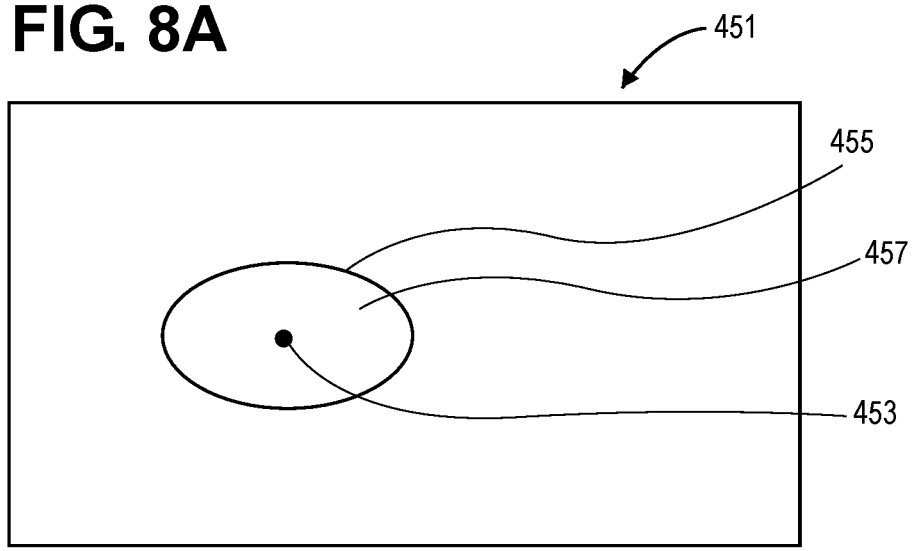
FIG. 8A shows an example of an impact zone which can be derived using the one or more methods according to an aspect which uses one or more microcircuits.
Figure 8B:
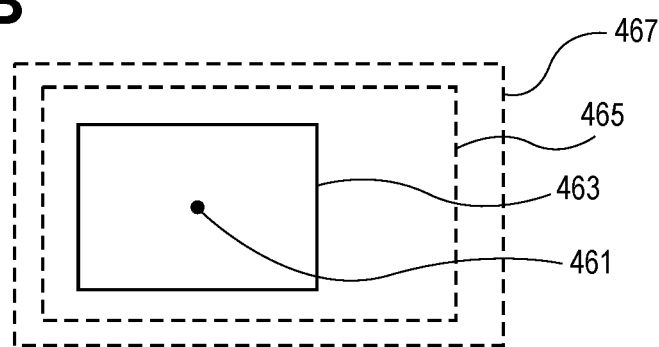
FIG. 8B shows an example of the geometry of a region and how the region can grow over time using a method according to an aspect that employs one or more microcircuits.

FIG. 8A shows an example of an impact zone 457 which surrounds a victim 453, and the perimeter or edge of the impact zone is defined by the perimeter 455. It is the perimeter 455 that is used in one embodiment in the convergence test of operation 407 to determine whether or not the solution has converged in operation 409. The victim 453 and the aggressors contained in the impact zone 457 are all logic elements in the integrated circuit 451 shown in FIG. 8A. As shown in FIG. 8B, the initial region can be grown asymmetrically in one embodiment. The direction and extent of the growth in each direction can be based upon the convergence testing, such as convergence testing in operation 407 and 409 in FIG. 7A and operation 307 shown in FIG. 6A. For example, peripheral areas that have voltage drops that are much further from convergence (in that they are much higher than a predetermined voltage drop used in the convergence testing) can be enlarged more than peripheral areas that are closer to convergence (in that they have much smaller voltage drops that are just above, near or below the predetermined voltage drop used in the convergence testing). In the example shown in FIG. 8B, the first region 463 which surrounds the victim 461 is grown asymmetrically in two iterations which include a first enlarged region 465 which is followed by a second enlarged region 467. The direction of growth is mostly to the right side as shown in FIG. 8B and there is much smaller growth towards the left side as shown in FIG. 8B. In the example shown in FIG. 8B, the region or cut is a rectangular region but it will be appreciated that other types of polygons can be used for the region or cut and those other types of polygons can also utilize asymmetric growth as described herein. The asymmetric growth may accelerate the convergence process. In certain embodiments, soft grounding of the bumps or power supply pins, such as power supply nodes 321 and 322 shown in FIG. 6B, can be used to accelerate the convergence process. A soft grounding is a grounding of a pin through a resistor rather than directly to ground.

Figure 7B:
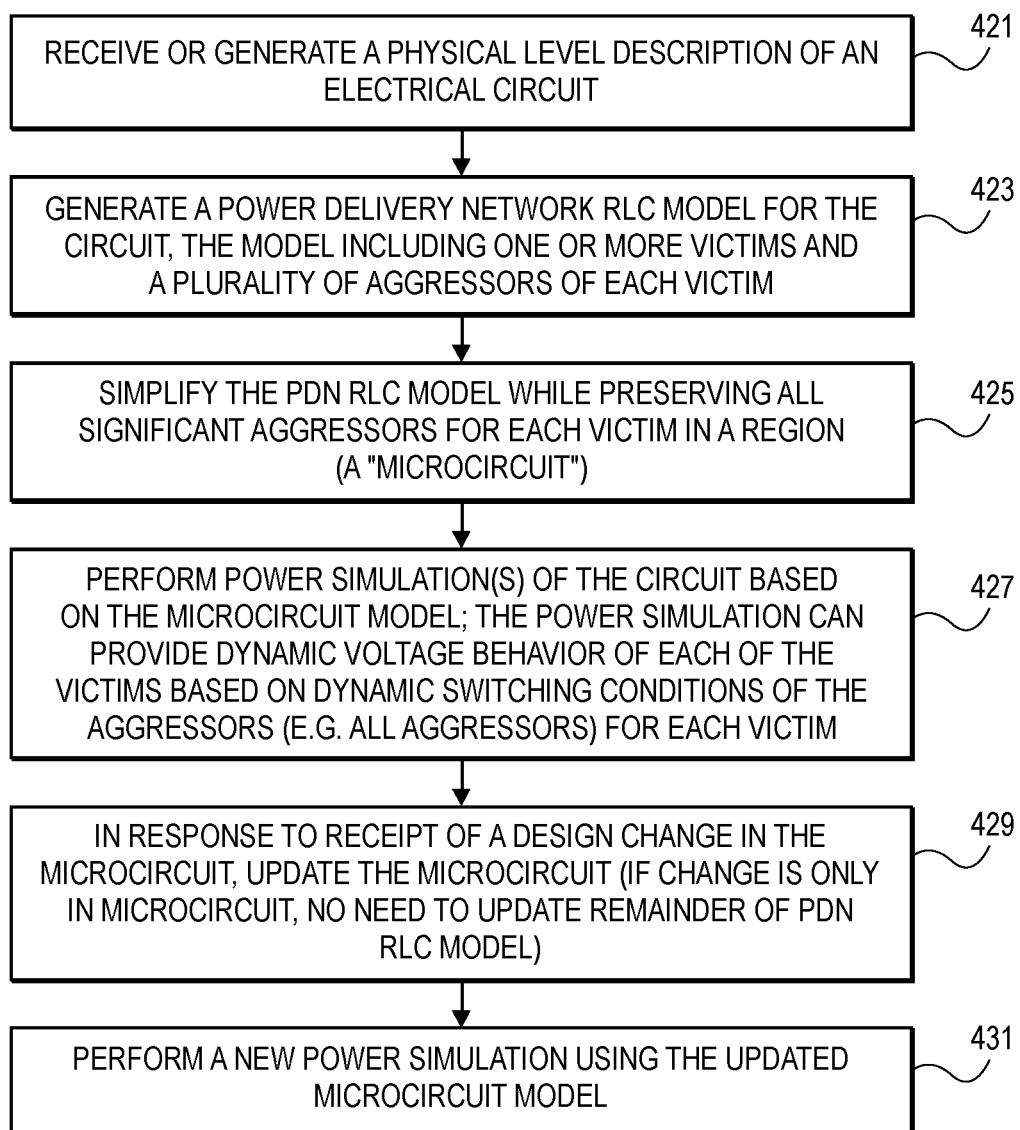
FIG. 7B shows a flowchart which illustrates a method which can be performed according to one embodiment that uses a microcircuit.

FIG. 7B shows a general, overall example of an embodiment which can use one or more microcircuits constructed using, for example, the method shown in FIG. 6A or the method shown in FIG. 7A. In operation 421, the system can receive or generate a physical level description of an electrical circuit. This physical level description can include information about the conductors in a power delivery network of the design of the electrical circuit which can be used to derive the connection resistances. In operation 423, the system can generate a power delivery network RLC model for the electrical circuit, and the model can include one or more victims and a plurality of aggressors for each victim. Then in operation 425, the power delivery network RLC model can be simplified while preserving all significant aggressors for each victim in a region, such as a microcircuit. The simplification in operation 425 can use the methods shown in either FIG. 6A or 7A to generate the region or microcircuit and then optimize the size of the region or microcircuit to ensure that a sufficient set of aggressors have been captured relative to each victim in the region or microcircuit. In one embodiment, the region or microcircuit can include a plurality of victims, and each of the victims can be associated with information about their corresponding set of aggressors and the voltage drops associated with those corresponding set of aggressors. In operation 427, the system can perform one or more power simulations of the circuit based on the microcircuit model. For example, the power simulation can provide dynamic voltage behavior of each of the victims based on dynamic switching conditions of the aggressors, such as all aggressors for each victim within only the region or microcircuit. This analysis or simulation can indicate to the designer that there is a need to change the design within the microcircuit. Thus the designer can change either logic elements within the microcircuit or the power delivery network within the microcircuit (or both). In operation 429, the system can receive the change in design within the microcircuit and update the microcircuit only with respect to the power distribution network RLC model for that updated microcircuit which can be then used in further simulations. Operation 429 allows the designer to update just a portion of the design without requiring the entire design to be updated and thus new simulations can be performed after only a portion of the design has been updated within the microcircuit model. This is shown as operation 431.

Figure 9A:
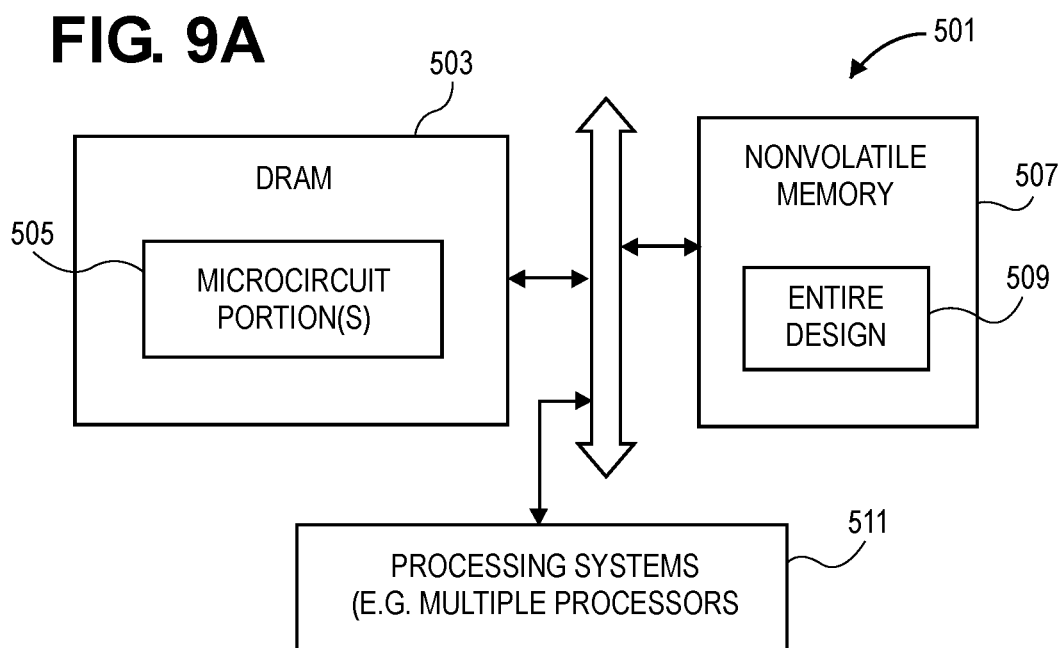
FIG. 9A shows an example of a data processing system which can be configured to perform one or more methods that use microcircuits.

There are several optimizations which can be used in conjunction with the construction and use of microcircuits. For example, during the creation or construction of the microcircuits and in some cases during the simulations, such as dynamic voltage drop simulations, of the microcircuits, it is possible to perform the creation or construction or simulations or other operations on just the microcircuit portions rather than the entire design. This enables a data processing system to load data about just the portions into main or working memory, such as DRAM memory while maintaining data about the entire design in nonvolatile memory, such as a hard drive memory or flash memory, etc. This optimization is shown in FIG. 9A. The data processing system 501 includes all DRAM 503 which stores just a portion of the design which is the portion relating to the microcircuits, and is shown as one or more microcircuit portions 505. These one or more microcircuit portions 505 provide data about only the microcircuit portions which are being analyzed or simulated while the remainder of the design remain stored in nonvolatile memory 507 and is shown as entire design 509. A processing system, such as multiple processors 511 can access the data in main or working memory (e.g. DRAM 503) and perform the construction and some simulations on just the microcircuit portions without having to store the entire design in working memory, such as DRAM 503. It will be appreciated that DRAM 503 is just one example of the type of memory that can be used for main or working memory and that other types of memory can also be used for main or working memory. Moreover, because each microcircuit can be treated and processed separately, several processors can operate separately and in parallel on each microcircuit portion to provide enhanced parallel processing of the various microcircuit portions. This also can improve computational efficiency in performing the simulations. Another optimization which can be used in certain embodiments can perform convergence testing on candidate pins at the corners and optionally center of a microcircuit region. When the region is enlarged, this processing can be repeated at the edge or periphery of the region.

Figure 9B:
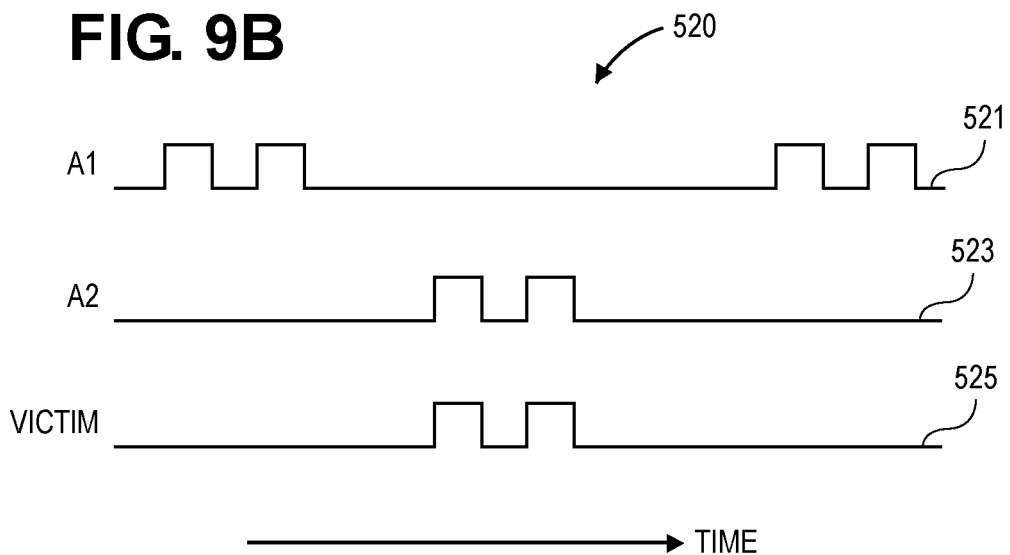
FIG. 9B shows an example of a timing diagram of three different signals that can be used when simulating dynamic voltage drops in a design.

FIG. 9B shows another optimization which can be performed with the one or more embodiments described herein. For example, the simulations or other analyses performed in operation 311 of FIG. 6A and in operation 412 in FIG. 7A can utilize timing information about the victim relative to timing information about the set of aggressors within a region or microcircuit containing the victim. For example, if certain aggressors in a region containing a victim do not switch at the same time as the victim, then those aggressors can be ignored in one embodiment when performing the dynamic voltage drop simulations for the victim. In other words, the simulation of the dynamic voltage drop of the particular victim is performed using aggressors that switch at the same time or nearly the same time as the victim and the simulations ignore the effect of local aggressors within the region of the victim that do not switch at the same time (or nearly the same time) as the victim. This is shown in the switching waveforms 520 of FIG. 9B. Aggressor A1 is shown over time as signal 521. Aggressor A2 is shown over time as signal 523. The victim is shown as having the signal 525, and it can be seen that the victim switches at the same time or nearly the same time as the aggressor A2 while the aggressor A1 does not switch at the same time as the victim. Thus, the simulation of the dynamic voltage drop within a region of the victim containing both aggressors A1 and A2 can use switching for just A2 and not A1 thereby ignoring A1 because it is not likely to affect the victim.

Figure 10A:
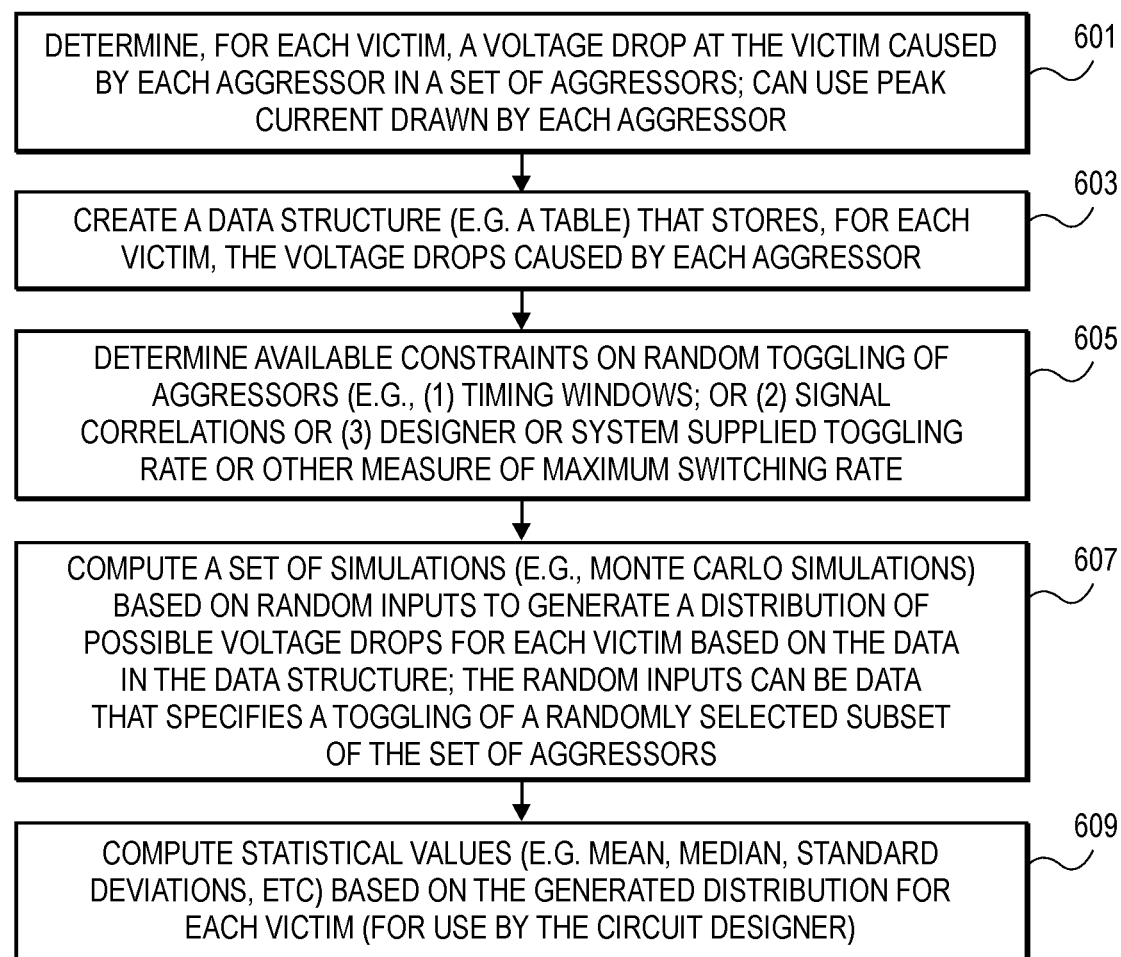
FIG. 10A shows a flowchart which illustrates a method according to an aspect which uses a data structure and simulations to derive distributions of voltage drops for a victim.

Another aspect of this disclosure relates to the use of data structures containing dynamic voltage drop information to derive distributions of voltage drops for a set of victims in a design of an electrical circuit. This aspect in one embodiment can also use the aspect of microcircuits described above and can also use the aspect of correlated signal groups also described above. FIG. 10A shows an example of the aspect that uses data structures to derive distributions of voltage drops for a set of victims in the design.

In operation 601 of FIG. 10A, a system can determine, for each victim, a voltage drop at the victim caused by each aggressor in a set of aggressors. In one embodiment, the determination of the voltage drop at the victim can use a peak current drawn by each aggressor, which peak current can be available from information about the design such as, for example, data from an Apache Power Library format or CCS Power or a direct SPICE simulation of the switching event of an aggressor. Operation 601 generates, for each victim, a plurality of voltage drops caused by each aggressor in the set of aggressors, and this voltage drop data can be stored in a data structure, such as a table, in operation 603. The table can store, for each victim, the voltage drops caused by each aggressor, and these voltage drops can be based upon the peak current drawn by each aggressor in one embodiment. FIG. 10C shows an example of such a table which will be described further below. In operation 605, the system can determine whether there are any available constraints which can constrain the random toggling of aggressors, which random toggling can occur in a set of simulations such as Monte Carlo simulations to be described further below. In one embodiment, these constraints can include one or more of: (1) timing windows or other timing relationships between switching times of each victim and switching times of each aggressor in the set of aggressors; see, for example, FIG. 9B and the description associated with FIG. 9B; (2) identified groups having signal correlations; see for example the methods described with reference to FIGS. 3 and 4 above; or (3) data such as an input from a designer or a system that specifies a toggling rate or maximum switching rate or desired toggling rate for the design. These constraints can be used to filter the simulations to provide more realistic results by limiting the subset of aggressors that are randomly selected during each simulation in the set of simulations to be described further below. In operation 607, the system can compute a set of simulations, such as a Monte Carlo simulation, based upon random inputs to generate a distribution of possible voltage drops for each victim based on the data in the table or other data structure. The random inputs can be data that specifies a toggling of a randomly selected subset of the set of aggressors in each simulation, wherein the randomly selected subset varies randomly across the set of simulations to generate the distribution of possible voltage drops for each victim. The simulations performed in operation 607 can randomly generate a subset of the set of aggressors which toggle in any given simulation. Thus one random input can specify that about 20% of the set of aggressors switch in one simulation while another random input for another simulation can specify that about 40% of the set of aggressors switch. In both cases, the percentage can be limited to be less than a specified maximum switching percentage or other designer or system supplied toggling rate if available. Moreover, the random subset can be constrained to exclude aggressors that do not switch at the same time as the victim, and the random subset can be constrained to take into account signal correlations as described above (see, for example, the methods described with reference to FIGS. 3 and 4). The data from the simulations performed in operation 607 can be used in operation 609 to compute statistical values. In one embodiment, these statistical values can include mean data, median data, and standard deviation data which are based upon the generated distributions for each victim. These statistical values can be used by the circuit design to evaluate the need for possible modifications to the circuit design, such as the logic elements or other instances in the design as well as possible modifications to the power delivery network.

FIG. 10B shows another method, which is similar to the method shown in FIG. 10A, except the method shown in FIG. 10B can make use of the microcircuit aspect described herein. In operation 631, the system can receive or generate a physical level description of an electrical circuit. The physical level description provides substantial data about components in the circuit which allows calculations of resistances along paths in the power delivery network and calculations of current flows within transistors in the design. Then in operation 633, the system can generate from the description a power delivery network RLC model and then construct a simplified power delivery network RLC ("microcircuit") for each victim; in one embodiment, operation 633 can use the method shown in FIG. 7A or can use the method shown in FIG. 6A to create the simplified power delivery network RLC. In operation 635, the system can use the microcircuit for each victim to identify all cells or instances in the victim that, if they switch, can cause the power supply to the victim to drop more than a predetermined threshold, such as, for example one millivolt, and this collection can be deemed the set of aggressors for that victim. In one embodiment, operation 635 represents the use of the microcircuit or region to identify the sufficient set of aggressors that can be deemed to have a material impact on the victim. Then in operation 637, the system can use each aggressor's peak current and the effective resistance along the power delivery network from the aggressor to the victim to compute the dynamic voltage drop caused by that aggressor. This can be performed for each victim relative to its set of aggressors for that victim, and the results of these computations can be used to create a table or other data structure mapping each aggressor's voltage drop contribution to its victim. FIG. 10C shows an example of such a voltage drop table.

Figure 11A:
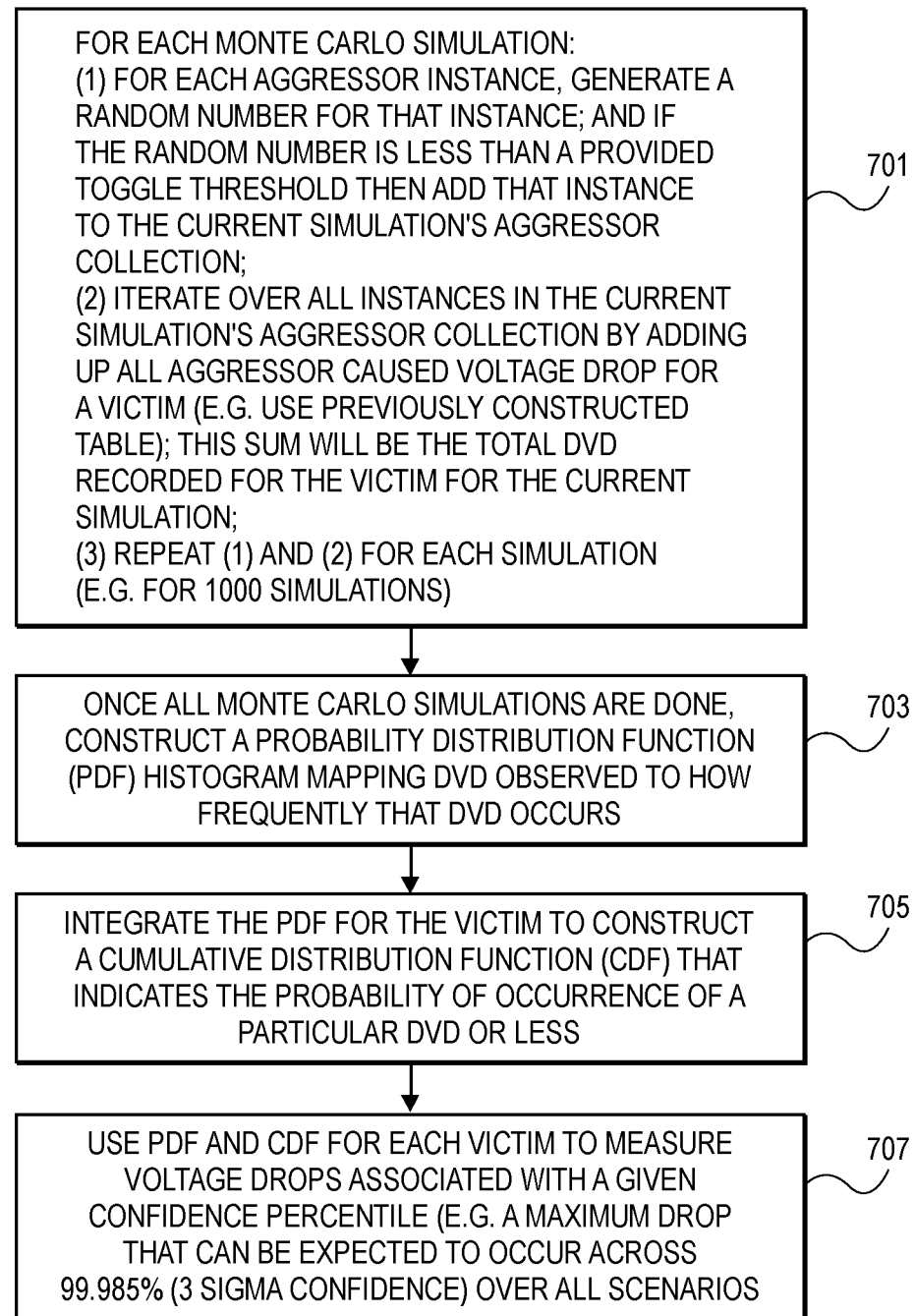
FIG. 11A shows a flowchart which illustrates the simulations that can be based upon a data structure, such as the data structure shown in FIG. 10C, to derive distributions of voltage drops for a victim.

Referring now to FIG. 10C, the voltage drop table 651 includes three columns: a victim column 653, an aggressor column 655, and a voltage drop column 657. The victim column 653 shows the victims, with each victim being associated with an aggressor along a row with its associated voltage drop caused by that aggressor. For example the first row in table 651 shows that victim V1 has a voltage drop of 0.015 V caused by the aggressor A1. The aggressors for each victim in the table can be limited by the region or microcircuit in one embodiment. As shown in FIG. 10C, the victim V1 has merely three aggressors which may have been limited by the use of a microcircuit method (e.g., such as in FIG. 7A), and the table 651 also includes a summation of the effect of all of the aggressors in the set of aggressors limited by the microcircuit for the victim V1. This summation can be performed in operation 639 in which the sum of each aggressor's voltage drop contribution at its victim is added together by applying the superposition theorem of linear circuits (for the power delivery network) to compute the total voltage drop at the victim caused by all of its aggressors within the selected set of aggressors (that can be selected based upon the victim's microcircuit). The table 651 also includes data for a second victim V2 which has many more aggressors than victim V1 which may have been limited by the use of a microcircuit method (e.g., such as in FIG. 7A). In one embodiment, the table 651 can be sorted by voltage drop values such that the most significant voltage drop, and therefore the most significant aggressor, is listed first for each victim. The data structure or table created in operations 637 and 639 can be used in operation 641 by performing Monte Carlo simulations, and these simulations may be constrained by constraining the random subsets of aggressors used in each simulation. For example, the random subsets used in each simulation can be constrained, as described herein, by timing data, or signal correlations, or user specified maximum switching rate if available in one embodiment. FIG. 11A shows an example of one embodiment which uses Monte Carlo simulations.

Figure 11B:
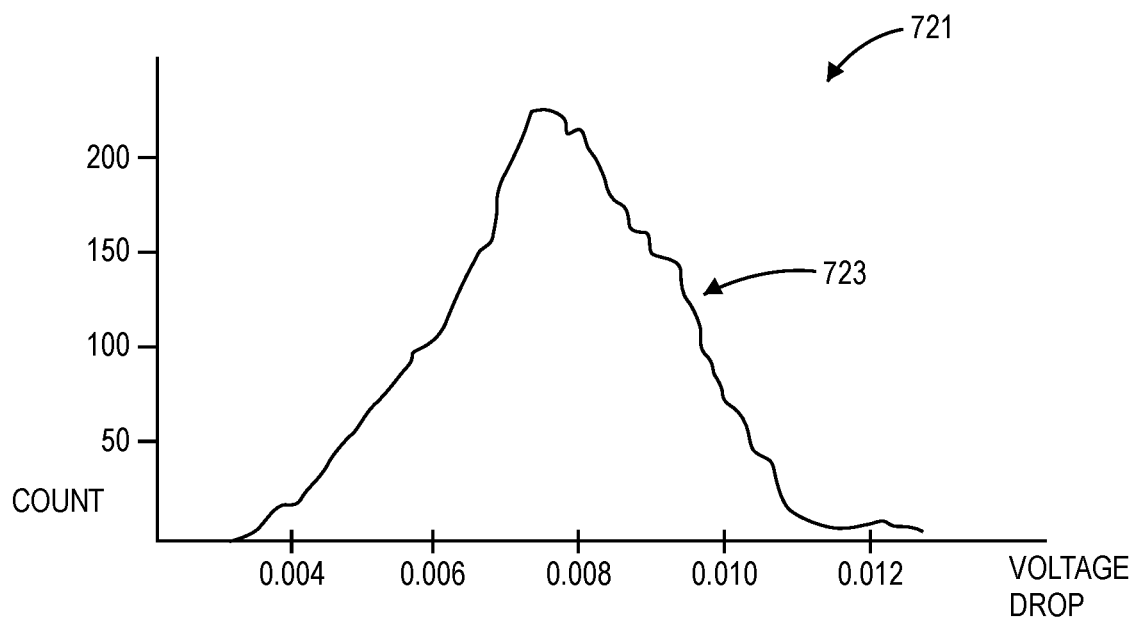
FIG. 11B shows a probability distribution function histogram of the voltage drops for a particular victim, wherein the histogram can be derived from a data structure such as the table shown in FIG. 10C.

In operation 701 of FIG. 11A, a system can create random inputs that include data that specify toggling of a randomly selected subset of the set of aggressors to cause them to switch voltage states in each simulation, wherein the randomly selected subset varies randomly across the simulations to generate a distribution of possible voltage drops for each victim. In one embodiment, operation 701 can include the operation of generating, for each aggressor instance, a random number for that instance and determining whether the random number is less than a provided toggle threshold (e.g. a maximum switching percentage provided by a designer) and if it is then adding that instance to the current simulation's aggressor collection; then, operation 701 can continue by iterating over all instances in the current simulation's aggressor collection by adding up all of the aggressor caused voltage drops for the victim. In one embodiment, the table may already include the sum and can be used directly if all of the aggressors of the victim are in the current simulation's aggressor collection; if the current simulation's aggressor collection does not include all of the aggressors of the victim in the table, then the sum needs to be computed for the reduced set of aggressors (that are in the current simulation's aggressor collection) for that victim. The sum can be considered the total dynamic voltage drop recorded for the victim for the current simulation based on the current simulation's aggressor collection. It will be appreciated that the aggressor collection (referred to in operation 701) for the current simulation is the randomly selected subset of the total set of aggressors for the current simulation. These operations within operation 701 are repeated for a plurality of cycles, each of which is a simulation; for example, in one embodiment 1000 or more cycles or simulations can be performed in order to generate a robust distribution of voltage drops for a particular victim. It will be appreciated that the set of aggressors which are available to create the random subsets can be constrained by the factors previously described including, for example timing data, signal correlations, and user specified maximum switching percentages. This is shown in operation 641 of FIG. 10 B. Referring back to FIG. 11A, in operation 703, once all Monte Carlo simulations are done, the system can construct a probability distribution function (PDF) histogram which maps the dynamic voltage drops observed to how frequently each particular dynamic voltage drop occurs. FIG. 11B shows an example of a probability distribution function histogram 721 that shows such mapping by the curve 723 in FIG. 11 B. Then in operation 705, the system can integrate the probability distribution function for the victim to construct a cumulative distribution function (CDF) for the victim that indicates the probability of the occurrence of a particular voltage drop or smaller voltage drop for that victim. In operation 707, the system or the designer can use both the probability distribution function histogram and the cumulative distribution function for each victim to measure voltage drops associated with a given confidence percentile. For example, the designer can determine that a maximum voltage drop that can be expected to occur across a certain standard deviation level (such as a three Sigma level of standard deviations) is less than a certain desired value over all possible scenarios. If the designer has a certain goal to limit voltage drops below a threshold, that threshold can be compared to the PDF and CDF curves to indicate what the confidence level is relative to that threshold value.

Figure 12:
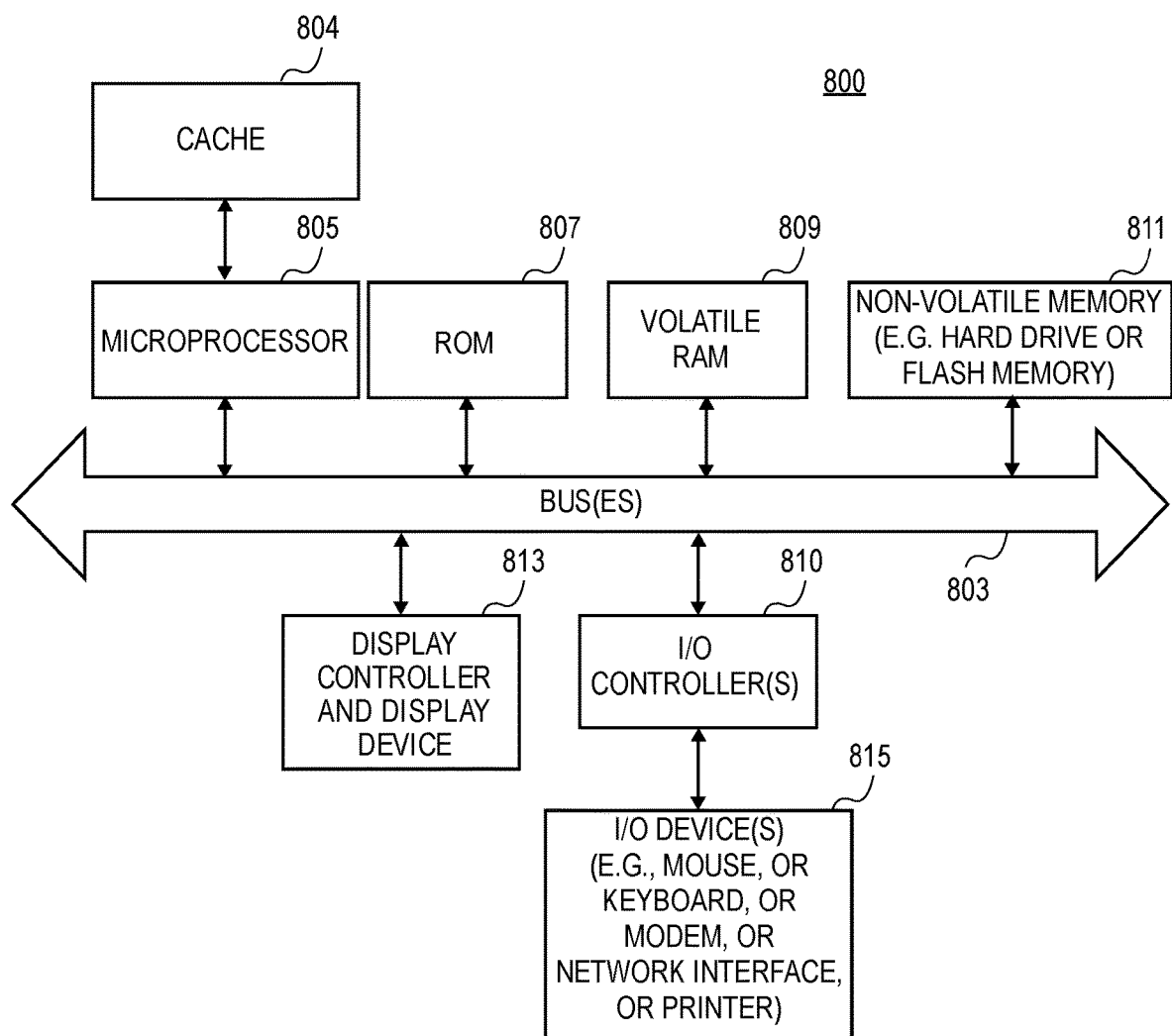
FIG. 12 shows an example of a data processing system that can be used to implement one or more of the embodiments described herein.

FIG. 12 shows one example of a data processing system 800, which may be used with one embodiment. For example, the system 800 may be implemented to provide a system 501 as shown in FIG. 9A. Note that while FIG. 12 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 12, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); DRAM; magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
   determining a set of one or more victims in a design of an electrical circuit;
   determining, in a simulation for each victim, a voltage drop caused by each aggressor in a set of aggressors in the design;
   creating a data structure that includes, for each victim, at least one of: (1) each voltage drop caused by each aggressor in the set of aggressors or (2) a linear sum of the voltage drop on each victim caused by all of the aggressors in the set of aggressors;
   computing a set of simulations based on random inputs to generate a distribution of possible voltage drops for each victim based on the data structure.

2. The medium as in claim 1 wherein the set of simulations is a Monte Carlo simulation and wherein the random inputs comprise data that specifies a toggling of a randomly selected subset of the set of aggressors to switch voltage states in each simulation, wherein the randomly selected subset varies across the set of simulations to generate the distribution of possible voltage drops for each victim.

3. The medium as in claim 2 wherein the randomly selected subset is constrained by one or more of: (1) a timing relationship between switching times of each victim and switching times of each aggressor in the set of aggressors; (2) one or more identified groups of correlated signals; or (3) an input for the design that specifies a toggling rate or maximum switching rate for the design.

4. The medium as in claim 3 wherein the constrained randomly selected subset has fewer aggressors than an unconstrained randomly selected subset.

5. The medium as in claim 4, wherein the method further comprises:
    creating, for each victim, a probability distribution function (PDF) based on the distribution of possible voltage drops; and
    deriving from the PDF one or more statistical values about voltage drops of each victim.

6. The medium as in claim 4 wherein the linear sum for each victim uses a superposition theorem to compute the linear sum.

7. The medium as in claim 4 wherein the set of aggressors is limited to a computed region that surrounds each victim, and the computed region, for each victim, is computed iteratively to capture a sufficient collection of aggressors that cause voltage drops, for each victim, that exceed one or more predetermined thresholds.

8. The medium as in claim 7 wherein the design is at a physical level description and the random inputs for the set of simulations are pseudorandom.

9. The medium as in claim 3 wherein the data structure is a table and wherein the method further comprises:
    determining a peak current of each aggressor to determine a maximum voltage drop at each victim.

10. The medium as in claim 9, wherein the method further comprises:
    sorting the table by voltage drops to determine, for each victim, the most significant aggressor.

11. A machine implemented method comprising:
    determining a set of one or more victims in a design of an electrical circuit;
    determining, in a simulation for each victim, a voltage drop caused by each aggressor in a set of aggressors in the design;
    creating a data structure that includes, for each victim, at least one of: (1) each voltage drop caused by each aggressor in the set of aggressors or (2) a linear sum of the voltage drop on each victim caused by all of the aggressors in the set of aggressors;
    computing a set of simulations based on random inputs to generate a distribution of possible voltage drops for each victim based on the data structure.

12. The method as in claim 11 wherein the set of simulations is a Monte Carlo simulation and wherein the random inputs comprise data that specifies a toggling of a randomly selected subset of the set of aggressors to switch voltage states in each simulation, wherein the randomly selected subset varies across the set of simulations to generate the distribution of possible voltage drops for each victim.

13. The method as in claim 12 wherein the randomly selected subset is constrained by one or more of: (1) a timing relationship between switching times of each victim and switching times of each aggressor in the set of aggressors; (2) one or more identified groups of correlated signals; or (3) an input for the design that specifies a toggling rate or maximum switching rate for the design.

14. The method as in claim 13 wherein the constrained randomly selected subset has fewer aggressors than an unconstrained randomly selected subset.

15. The method as in claim 14, wherein the method further comprises:
    creating, for each victim, a probability distribution function (PDF) based on the distribution of possible voltage drops; and
    deriving from the PDF one or more statistical values about voltage drops of each victim.

16. The method as in claim 14 wherein the linear sum for each victim uses a superposition theorem to compute the linear sum.

17. The method as in claim 14 wherein the set of aggressors is limited to a computed region that surrounds each victim, and the computed region, for each victim, is computed iteratively to capture a sufficient collection of aggressors that cause voltage drops, for each victim, that exceed one or more predetermined thresholds.

18. The method as in claim 17 wherein the design is at a physical level description and the random inputs for the set of simulations are pseudorandom.

19. The method as in claim 13 wherein the data structure is a table and wherein the method further comprises:
    determining a peak current of each aggressor to determine a maximum voltage drop at each victim.

20. The method as in claim 19, wherein the method further comprises:
    sorting the table by voltage drops to determine, for each victim, the most significant aggressor.

* * * * *